United States Patent
Paolini, Jr. et al.

(10) Patent No.: US 9,829,764 B2
(45) Date of Patent: Nov. 28, 2017

(54) MULTI-COLOR ELECTROPHORETIC DISPLAYS

(71) Applicant: E Ink Corporation, Billerica, MA (US)

(72) Inventors: Richard J. Paolini, Jr., Framingham, MA (US); George G. Harris, Woburn, MA (US); Jonathan D. Albert, Philadelphia, PA (US); Barrett Comiskey, Taipei (TW)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/653,669

(22) Filed: Jul. 19, 2017

(65) Prior Publication Data

US 2017/0315418 A1   Nov. 2, 2017

Related U.S. Application Data

(60) Continuation of application No. 14/987,191, filed on Jan. 4, 2016, now Pat. No. 9,740,076, which is a continuation of application No. 13/892,517, filed on May 13, 2013, now Pat. No. 9,268,191, which is a division of application No. 13/251,457, filed on Oct. 3, 2011, now Pat. No. 8,441,714, which is a continuation of application No. 12/725,997, filed on Mar. 17, 2010, now Pat. No. 8,040,594, which is a continuation-in-part of application No. 12/117,974, filed on May 9, 2008, now Pat. No. 7,791,789, which is a continuation of application No. 11/970,811, filed on Jan. 8, 2008, now Pat. No. 8,384,658, which is a (Continued)

(51) Int. Cl.
*G02B 26/00* (2006.01)
*G02F 1/167* (2006.01)
*G02F 1/133* (2006.01)
*G09G 3/34* (2006.01)
*G09G 3/20* (2006.01)

(52) U.S. Cl.
CPC .......... *G02F 1/167* (2013.01); *G02F 1/13306* (2013.01); *G09G 3/2003* (2013.01); *G09G 3/344* (2013.01); *G02F 2001/1678* (2013.01)

(58) Field of Classification Search
CPC .. G02F 1/167; G02F 2001/1678; G09G 3/344
USPC ............. 359/296; 345/107; 430/32; 204/600
See application file for complete search history.

(56) References Cited

U.S. PATENT DOCUMENTS 3,036,388 A   5/1962   Tate
3,406,363 A   10/1968  Tate
(Continued)

FOREIGN PATENT DOCUMENTS

EP   0281204 A2   9/1988
EP   0443571 A2   8/1991
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — William Choi
(74) *Attorney, Agent, or Firm* — Brian D. Bean

(57) ABSTRACT

A multi-color electrophoretic medium contains first, second and third species of particles. The first species of particles is light-scattering, while the second and third species of particles are transmissive. A method for driving such a display is also described.

5 Claims, 17 Drawing Sheets

Related U.S. Application Data continuation of application No. 10/729,044, filed on Dec. 5, 2003, now Pat. No. 7,352,353.

(56) References Cited

U.S. PATENT DOCUMENTS

| | | |
|---|---|---|
| 3,460,248 A | 8/1969 | Tate |
| 3,668,106 A | 6/1972 | Ota |
| 3,670,323 A | 6/1972 | Sobel et al. |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,062,009 A | 12/1977 | Raverdy |
| 4,093,534 A | 6/1978 | Carter |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata |
| 4,231,641 A | 11/1980 | Randin |
| 4,261,653 A | 4/1981 | Goodrich |
| 4,272,596 A | 6/1981 | Harbour |
| 4,298,448 A | 11/1981 | Muller |
| 4,305,807 A | 12/1981 | Somlyody |
| 4,311,361 A | 1/1982 | Somlyody |
| 4,345,249 A | 8/1982 | Togashi |
| 4,368,952 A | 1/1983 | Murata |
| 4,390,403 A | 6/1983 | Batchelder |
| 4,418,346 A | 11/1983 | Batchelder |
| 4,419,383 A | 12/1983 | Lee |
| 4,419,663 A | 12/1983 | Kohashi |
| 4,435,047 A | 3/1984 | Fergason |
| 4,438,160 A | 3/1984 | Ishikawa |
| 4,509,828 A | 4/1985 | Clerc |
| 4,620,916 A | 11/1986 | Zwemer |
| 4,643,528 A | 2/1987 | Bell, Jr. |
| 4,726,662 A | 2/1988 | Cromack |
| 4,772,102 A | 9/1988 | Fergason |
| 4,776,675 A | 10/1988 | Takaochi |
| 4,824,208 A | 4/1989 | Fergason |
| 4,832,458 A | 5/1989 | Fergason |
| 4,919,521 A | 4/1990 | Tada |
| 4,947,219 A | 8/1990 | Boehm |
| 5,017,225 A | 5/1991 | Nakanishi |
| 5,057,363 A | 10/1991 | Nakanishi |
| 5,082,351 A | 1/1992 | Fergason |
| 5,105,185 A | 4/1992 | Nakanowatari |
| 5,151,032 A | 9/1992 | Igawa |
| 5,187,609 A | 2/1993 | DiSanto |
| 5,223,115 A | 6/1993 | DiSanto |
| 5,250,932 A | 10/1993 | Yoshimoto |
| 5,262,098 A | 11/1993 | Crowley |
| 5,270,843 A | 12/1993 | Wang |
| 5,279,511 A | 1/1994 | DiSanto |
| 5,298,833 A | 3/1994 | Hou |
| 5,344,594 A | 9/1994 | Sheridon |
| 5,360,689 A | 11/1994 | Hou |
| 5,380,362 A | 1/1995 | Schubert |
| 5,383,008 A | 1/1995 | Sheridon |
| 5,389,945 A | 2/1995 | Sheridon |
| 5,403,518 A | 4/1995 | Schubert |
| 5,411,398 A | 5/1995 | Nakanishi |
| 5,411,656 A | 5/1995 | Schubert |
| 5,498,674 A | 3/1996 | Hou |
| 5,508,068 A | 4/1996 | Nakano |
| 5,512,162 A | 4/1996 | Sachs |
| 5,573,711 A | 11/1996 | Hou |
| 5,576,867 A | 11/1996 | Baur |
| 5,582,700 A | 12/1996 | Bryning |
| 5,604,027 A | 2/1997 | Sheridon |
| 5,627,561 A | 5/1997 | Laspina |
| 5,639,914 A | 6/1997 | Tomiyama |
| 5,643,673 A | 7/1997 | Hou |
| 5,650,872 A | 7/1997 | Saxe |
| 5,663,224 A | 9/1997 | Emmons |
| 5,689,282 A | 11/1997 | Wolfs |
| 5,707,738 A | 1/1998 | Hou |
| 5,707,747 A | 1/1998 | Tomiyama |
| 5,708,525 A | 1/1998 | Sheridon |
| 5,717,283 A | 2/1998 | Biegelsen |
| 5,717,514 A | 2/1998 | Sheridon |
| 5,737,115 A | 4/1998 | Mackinlay |
| 5,739,801 A | 4/1998 | Sheridon |
| 5,745,094 A | 4/1998 | Gordon, II et al. |
| 5,751,268 A | 5/1998 | Sheridon |
| 5,754,332 A | 5/1998 | Crowley |
| 5,760,761 A | 6/1998 | Sheridon |
| 5,767,826 A | 6/1998 | Sheridon |
| 5,777,782 A | 7/1998 | Sheridon |
| 5,783,614 A | 7/1998 | Chen |
| 5,808,783 A | 9/1998 | Crowley |
| 5,852,427 A | 12/1998 | Buzak |
| 5,872,552 A | 2/1999 | Gordon, II |
| 5,930,026 A | 7/1999 | Jacobson |
| 5,961,804 A | 10/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,067,185 A | 5/2000 | Albert |
| 6,097,531 A | 8/2000 | Sheridon |
| 6,117,368 A | 9/2000 | Hou |
| 6,118,426 A | 9/2000 | Albert |
| 6,120,588 A | 9/2000 | Jacobson |
| 6,120,839 A | 9/2000 | Comiskey |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,249,271 B1 | 6/2001 | Albert |
| 6,252,564 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,323,989 B1 | 11/2001 | Jacobson |
| 6,327,072 B1 | 12/2001 | Comiskey |
| 6,376,828 B1 | 4/2002 | Comiskey |
| 6,377,387 B1 | 4/2002 | Duthaler |
| 6,392,785 B1 | 5/2002 | Albert |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,445,489 B1 | 9/2002 | Jacobson |
| 6,459,418 B1 | 10/2002 | Comiskey |
| 6,473,072 B1 | 10/2002 | Comiskey |
| 6,480,182 B2 | 11/2002 | Turner |
| 6,498,114 B1 | 12/2002 | Amundson |
| 6,504,524 B1 | 1/2003 | Gates |
| 6,506,438 B2 | 1/2003 | Duthaler |
| 6,512,354 B2 | 1/2003 | Jacobson |
| 6,515,649 B1 | 2/2003 | Albert |
| 6,518,949 B2 | 2/2003 | Drzaic |
| 6,521,489 B2 | 2/2003 | Duthaler et al. |
| 6,531,997 B1 | 3/2003 | Gates |
| 6,535,197 B1 | 3/2003 | Comiskey |
| 6,538,801 B2 | 3/2003 | Jacobson |
| 6,545,291 B1 | 4/2003 | Amundson |
| 6,580,545 B2 | 6/2003 | Morrison |
| 6,636,186 B1 | 10/2003 | Yamaguchi |
| 6,639,578 B1 | 10/2003 | Comiskey |
| 6,652,075 B2 | 11/2003 | Jacobson |

(56) References Cited

U.S. PATENT DOCUMENTS

| | | |
|---|---|---|
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,693,620 B1 | 2/2004 | Herb |
| 6,704,133 B2 | 3/2004 | Gates |
| 6,710,540 B1 | 3/2004 | Albert |
| 6,721,083 B2 | 4/2004 | Jacobson |
| 6,724,519 B1 | 4/2004 | Morrison |
| 6,727,881 B1 | 4/2004 | Albert |
| 6,738,050 B2 | 5/2004 | Comiskey |
| 6,750,473 B2 | 6/2004 | Amundson |
| 6,753,999 B2 | 6/2004 | Zehner |
| 6,788,449 B2 | 9/2004 | Liang |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,829 B1 | 11/2004 | Albert |
| 6,825,970 B2 | 11/2004 | Goenaga |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,864,875 B2 | 3/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,870,661 B2 | 3/2005 | Pullen et al. |
| 6,900,851 B2 | 5/2005 | Morrison |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson |
| 7,002,728 B2 | 2/2006 | Pullen et al. |
| 7,012,600 B2 | 3/2006 | Zehner |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates |
| 7,038,655 B2 | 5/2006 | Herb |
| 7,061,663 B2 | 6/2006 | Cao et al. |
| 7,071,913 B2 | 7/2006 | Albert |
| 7,075,502 B1 | 7/2006 | Drzaic |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango |
| 7,280,094 B2 | 10/2007 | Albert |
| 7,292,386 B2 | 11/2007 | Kanbe |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner |
| 7,312,916 B2 | 12/2007 | Pullen |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,369,299 B2 | 5/2008 | Sakurai et al. |
| 7,375,875 B2 | 5/2008 | Whitesides |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson |
| 7,442,587 B2 | 10/2008 | Amundson et al. |
| 7,443,571 B2 | 10/2008 | LeCain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. |
| 7,495,819 B2 | 2/2009 | Sakurai et al. |
| 7,513,813 B2 | 4/2009 | Paolini, Jr. et al. |
| 7,528,822 B2 | 5/2009 | Amundson |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,545,557 B2 | 6/2009 | Iftime |
| 7,551,346 B2 | 6/2009 | Fazel |
| 7,554,712 B2 | 6/2009 | Patry et al. |
| 7,561,324 B2 | 7/2009 | Duthaler et al. |
| 7,583,251 B2 | 9/2009 | Arango |
| 7,583,427 B2 | 9/2009 | Danner |
| 7,598,173 B2 | 10/2009 | Ritenour |
| 7,602,374 B2 | 10/2009 | Zehner |
| 7,605,799 B2 | 10/2009 | Amundson et al. |
| 7,612,760 B2 | 11/2009 | Kawai |
| 7,636,191 B2 | 12/2009 | Duthaler |
| 7,646,530 B2 | 1/2010 | Takagi et al. |
| 7,649,666 B2 | 1/2010 | Isobe et al. |
| 7,649,674 B2 | 1/2010 | Danner |
| 7,652,656 B2 | 1/2010 | Chopra |
| 7,667,684 B2 | 2/2010 | Jacobson et al. |
| 7,667,886 B2 | 2/2010 | Danner |
| 7,672,040 B2 | 3/2010 | Sohn |
| 7,679,599 B2 | 3/2010 | Kawai |
| 7,679,814 B2 | 3/2010 | Paolini, Jr. et al. |
| 7,688,297 B2 | 3/2010 | Zehner |
| 7,688,497 B2 | 3/2010 | Danner |
| 7,705,823 B2 | 4/2010 | Nihei |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson |
| 7,733,335 B2 | 6/2010 | Zehner |
| 7,733,554 B2 | 6/2010 | Danner et al. |
| 7,746,544 B2 | 6/2010 | Comiskey |
| 7,785,988 B2 | 8/2010 | Amundson |
| 7,787,169 B2 | 8/2010 | Abramson et al. |
| 7,791,782 B2 | 9/2010 | Paolini, Jr. |
| 7,791,789 B2 | 9/2010 | Albert |
| 7,826,129 B2 | 11/2010 | Wu |
| 7,839,564 B2 | 11/2010 | Whitesides et al. |
| 7,843,621 B2 | 11/2010 | Danner et al. |

(56) References Cited

U.S. PATENT DOCUMENTS

| | | | |
|---|---|---|---|
| 7,843,624 B2 | 11/2010 | Danner | |
| 7,843,626 B2 | 11/2010 | Amundson et al. | |
| 7,848,006 B2 | 12/2010 | Wilcox | |
| 7,848,007 B2 | 12/2010 | Paolini, Jr. | |
| 7,848,009 B2 | 12/2010 | Machida | |
| 7,859,637 B2 | 12/2010 | Amundson et al. | |
| 7,893,435 B2 | 2/2011 | Kazlas et al. | |
| 7,898,717 B2 | 3/2011 | Patry et al. | |
| 7,903,319 B2 | 3/2011 | Honeyman | |
| 7,907,327 B2 | 3/2011 | Jang | |
| 7,910,175 B2 | 3/2011 | Webber | |
| 7,952,557 B2 | 5/2011 | Amundson | |
| 7,952,790 B2 | 5/2011 | Honeyman | |
| 7,956,841 B2 | 6/2011 | Albert | |
| 7,957,053 B2 | 6/2011 | Honeyman | |
| 7,999,787 B2 | 8/2011 | Amundson | |
| 8,009,348 B2 | 8/2011 | Zehner | |
| 8,018,640 B2 | 9/2011 | Whitesides et al. | |
| 8,027,081 B2 | 9/2011 | Danner | |
| 8,034,209 B2 | 10/2011 | Danner | |
| 8,035,886 B2 | 10/2011 | Jacobson | |
| 8,064,962 B2 | 11/2011 | Wilcox et al. | |
| 8,068,090 B2 | 11/2011 | Machida | |
| 8,068,272 B2 | 11/2011 | LeCain et al. | |
| 8,077,141 B2 | 12/2011 | Duthaler | |
| 8,089,453 B2 | 1/2012 | Comiskey | |
| 8,115,729 B2 | 2/2012 | Danner | |
| 8,125,501 B2 | 2/2012 | Amundson | |
| 8,129,655 B2 | 3/2012 | Jacobson et al. | |
| 8,139,050 B2 | 3/2012 | Jacobson et al. | |
| 8,174,490 B2 | 5/2012 | Whitesides | |
| 8,177,942 B2 | 5/2012 | Paolini, Jr. | |
| 8,289,250 B2 | 10/2012 | Zehner | |
| 8,300,006 B2 | 10/2012 | Zhou | |
| 8,314,784 B2 | 11/2012 | Ohkami | |
| 8,319,759 B2 | 11/2012 | Jacobson | |
| 8,384,658 B2 | 2/2013 | Albert | |
| 8,390,301 B2 | 3/2013 | Danner | |
| 8,390,918 B2 | 3/2013 | Wilcox | |
| 8,422,116 B2 | 4/2013 | Sprague | |
| 8,466,852 B2 | 6/2013 | Drzaic | |
| 8,482,835 B2 | 7/2013 | LeCain | |
| 8,558,783 B2 | 10/2013 | Wilcox | |
| 8,610,988 B2 | 12/2013 | Zehner et al. | |
| 8,797,255 B2 | 8/2014 | Hsu | |
| 8,928,562 B2 | 1/2015 | Gates et al. | |
| 9,199,441 B2 | 12/2015 | Danner | |
| 9,293,511 B2 | 3/2016 | Jacobson | |
| 9,412,314 B2 | 8/2016 | Amundson | |
| 2002/0060321 A1 | 5/2002 | Kazlas | |
| 2002/0090980 A1 | 7/2002 | Wilcox et al. | |
| 2003/0070929 A1* | 4/2003 | Shannon | G02F 1/167 204/606 |
| 2003/0102858 A1 | 6/2003 | Jacobson | |
| 2004/0105036 A1 | 6/2004 | Danner et al. | |
| 2004/0119681 A1 | 6/2004 | Albert et al. | |
| 2005/0012980 A1 | 1/2005 | Wilcox | |
| 2005/0122306 A1 | 6/2005 | Wilcox et al. | |
| 2005/0122563 A1 | 6/2005 | Honeyman et al. | |
| 2005/0156340 A1 | 7/2005 | Valianatos et al. | |
| 2005/0253777 A1 | 11/2005 | Zehner | |
| 2005/0259068 A1 | 11/2005 | Nihei et al. | |
| 2006/0087479 A1 | 4/2006 | Sakurai et al. | |
| 2006/0087489 A1 | 4/2006 | Sakurai et al. | |
| 2006/0209008 A1 | 9/2006 | Nihei et al. | |
| 2006/0214906 A1 | 9/2006 | Kobayashi et al. | |
| 2007/0052757 A1 | 3/2007 | Jacobson | |
| 2007/0091417 A1 | 4/2007 | Cao et al. | |
| 2007/0091418 A1 | 4/2007 | Danner et al. | |
| 2007/0103427 A1 | 5/2007 | Zhou et al. | |
| 2007/0285385 A1 | 12/2007 | Albert | |
| 2008/0024429 A1 | 1/2008 | Zehner | |
| 2008/0024482 A1 | 1/2008 | Gates | |
| 2008/0043318 A1 | 2/2008 | Whitesides | |
| 2008/0048970 A1 | 2/2008 | Drzaic | |
| 2008/0130092 A1 | 6/2008 | Whitesides | |
| 2008/0136774 A1 | 6/2008 | Harris | |
| 2008/0291129 A1 | 11/2008 | Harris | |
| 2009/0009852 A1 | 1/2009 | Honeyman | |
| 2009/0122389 A1 | 5/2009 | Whitesides | |
| 2009/0174651 A1 | 7/2009 | Jacobson | |
| 2009/0195568 A1 | 8/2009 | Sjodin | |
| 2010/0060628 A1 | 3/2010 | Lenssen et al. | |

FOREIGN PATENT DOCUMENTS

| | | |
|---|---|---|
| EP | 1099207 | 5/2001 |
| EP | 1145072 | 10/2001 |
| GB | 1465701 A | 3/1997 |
| JP | S5998227 A | 6/1984 |
| JP | S60189731 A | 9/1985 |
| JP | S6258222 A | 3/1987 |
| JP | S62231930 A | 10/1987 |
| JP | S62269124 A | 11/1987 |
| JP | S62299824 A | 12/1987 |
| JP | S6486116 | 3/1989 |
| JP | S6486117 | 3/1989 |
| JP | H01142537 | 6/1989 |
| JP | H01248182 | 10/1989 |
| JP | H01267525 A | 10/1989 |
| JP | H02223934 | 9/1990 |
| JP | H02223935 | 9/1990 |
| JP | H02223936 | 9/1990 |
| JP | H02284124 A | 11/1990 |
| JP | H02284125 | 11/1990 |
| JP | H05165064 | 6/1993 |
| JP | H05173194 A | 7/1993 |
| JP | H05307197 | 11/1993 |
| JP | H09230391 A | 9/1997 |
| JP | H10149118 A | 6/1998 |
| JP | 2001034200 A | 2/2001 |
| JP | 2003330179 A | 11/2003 |
| JP | 2009145599 | 7/2009 |
| JP | 2009192637 | 8/2009 |
| WO | 8202961 A1 | 9/1982 |
| WO | 2000036560 A1 | 6/2000 |
| WO | 2000038000 A1 | 6/2000 |
| WO | 2000067110 A1 | 11/2000 |
| WO | 2001007961 A1 | 2/2001 |
| WO | 2009119156 A1 | 10/2009 |

OTHER PUBLICATIONS

Yamaguchi, Y. et al., "Toner display using insulative particles charged triboelectrically", Asia Display/IDW '01, pp. 1729-1730, Paper AMD4-4 (2001). Jan. 1, 2001.

Yang, Y. et al., "A new architecture for polymer transistors", Nature, vol. 372, p. 344 (1994). Jan. 1, 1994.

Zehner, R. et al., "Drive Waveforms for Active Matrix Electrophoretic Displays", SID 03 Digest, pp. 842-845 (2003). Dec. 31, 2003.

Amundson, K., "Electrophoretic Imaging Films for Electronic Paper Displays" in Crawford, G. ed. Flexible Flat Panel Displays, John Wiley & Sons, Ltd., Hoboken, NJ (2005) Dec. 31, 2005.

Amundson, Karl, et al., "12.3: Flexible, Active-Matrix Display Constructed Using a Microencapsulated Electrophoretic Material and an Organic-Semiconductor-Based Backplane", SID 01 Digest, pp. 160-163 (Jun. 2001). Jun. 30, 2001.

Au, J. et al., "Ultra-Thin 3.1-in. Active-Matrix Electronic Ink Display for Mobile Devices", IDW'02, pp. 223-226 (2002). Dec. 31, 2002.

Bach, U. et al., "Nanomaterials-Based Electrochromics for Paper-Quality Displays", Adv. Mater., vol. 14, No. 11, pp. 845-848 (Jun. 2002). Jun. 5, 2002.

Beilin, S. et al., "8.5: 2000-Character Electrophoretic Display", SID 86 Digest, 136 (1986). Jan. 1, 1986.

Bohnke et al., "Polymer-Based Solid Electrochromic Cell for Matrix-Addressable Display Devices." J. Electrochem. Soc., 138, 3612 (1991) Dec. 31, 1991.

Bouchard, A. et al., "High-Resolution Microencapsulated Electrophoretic Display on Silicon", SID 04 Digest, pp. 651-653 (2004). Dec. 31, 2004.

(56) References Cited

OTHER PUBLICATIONS

Bryce, M.R., "Seeing through synthetic metals", Nature, vol. 335, pp. 12-13, (Sep. 1988). Sep. 1, 1988.
Caillot, E. et al. "Active Matrix Electrophoretic Information Display for High Performance Mobile Devices", IDMC Proceedings (2003) Dec. 31, 2003.
Chen, Y., et al., "A Conformable Electronic Ink Display using a Foil-Based a-Si TFT Array", SID 01 Digest, pp. 157-159 (Jun. 2001). Jun. 30, 2001.
Chiang, A.; "Conduction Mechanism of Charge Control Agents Used in Electrophoretic Display Devices"; Proceeding of the SID; vol. 18/3&4; pp. 275-282; 1977. Dec. 31, 1977.
Chiang, A. et al., "A High Speed Electrophoretic Matrix Display", SID 80 Digest, 114 (1980). Jan. 1, 1980.
Comiskey, B., et al., "An electrophoretic ink for all-printed reflective electronic displays", Nature, 394, pp. 253-255 (1998). Dec. 31, 1998.
Comiskey, B., et al., "Electrophoretic Ink: A Printable Display Material", SID 97 Digest, pp. 75-76 (1997). Dec. 31, 1997.
Croucher, M.D., et al., "Electrophoretic Display: Materials as Related to Performance", Photog. Sci. Eng., 25, 80 (1981) Dec. 31, 1981.
Dalisa, A.L., "Electrophoretic Display Technology", IEEE Trans. Electron Dev., ED-24, 827 (1977) Jul. 31, 1977.
Danner, G.M. et al., "Reliability Performance for Microencapsulated Electrophoretic Displays with Simulated Active Matrix Drive", SID 03 Digest, 573 (2003) Dec. 31, 2003.
Drzaic, P., et al., "A Printed and Rollable Bistable Electronic Display", SID 98 Digest, pp. 1131-1134 (1998). Dec. 31, 1998.
Duthaler, G., et al., "Active-Matrix Color Displays Using Electrophoretic Ink and Color Filters", SID 02 Digest, pp. 1374-1377 (2002). Dec. 31, 2002.
Egashira, N. et al., "Solid electrochromic cell consisting of Lu-diphthalocyanine and lead floride", Proceedings of the SID, vol. 28/3, pp. 227-232 (1987) Jan. 1, 1987.
Fitzhenry, B.; "Optical effects of adsorption of dyes on pigment used in electrophoretic image displays"; Applied Optics; vol. 18, No. 19; p. 3332; Oct. 1979. Oct. 1, 1979.
Fitzhenry-Ritz, B.; "Optical Properties of Electrocphoretic Image Displays"; Proceedings of the SID; vol. 22/4; 1981. Jan. 1, 1981.
Gates, H. et al. "A5 Sized Electronic Paper Display for Document Viewing", SID 05 Digest (2005) Dec. 31, 2005.
Goodman, L.A.; "Passive Liquid Displays: Liquid Crystals, Electrophoretics, and Electrochromics"; Proceedings of the SID; vol. 17, p. 30; 1976. Jan. 1, 1976.
Hatano, T. et al., "18:3: Bistable Paper-White Display Device Using Cholesteric Liquid Crystals", SID 96 Digest, 269 (1996). Jan. 1, 1996.
Henzen, A. et al., "Development of Active Matrix Electronic Ink Displays for Handheld Devices", SID 03 Digest, 176, (2003) Dec. 31, 2003.
Henzen, A. et al., "An Electronic Ink Low Latency Drawing Tablet", SID 04 Digest, 1070 (2004) Dec. 31, 2004.
Henzen, A. et al., "Development of Active Matrix Electronic Ink Displays for Smart Handheld Applications", IDW'02, 227 (2002) Dec. 31, 2002.

Jacobson, J., et al., "The last book", IBM Systems J., 36, 457 (1997) Dec. 31, 1997.
Ji, Y. et al., "P-50: Polymer Walls in Higher-Polymer-Content Bistable Reflective Cholesteric Displays", SID 96 Digest, 611 (1996). Jan. 1, 1996.
Jin, S. et al., "Optically Transparent, Electrically Conductive Composite Medium", Science, vol. 255, 446 (1992). Jan. 1, 1992.
Jo, G-R, et al., "Toner Display Based on Particle Movements", Chem. Mater, 14, pp. 664-669 (2002). Dec. 31, 2002.
Johnson, M. et al., "High Quality Images on Electronic Paper Displays", SID 05 Digest, 1666 (2005) Dec. 31, 2005.
Kazlas, P., et al., "12.1" SVGA Microencapsulated Electrophoretic Active Matrix Display for Information Appliances", SID 01 Digest, pp. 152-155 (Jun. 2001). Jun. 30, 2001.
Kazlas, P. et al., "Card-size Active-matrix Electronic Ink Display", Eurodisplay 2002, 259 (2002) Dec. 31, 2002.
Kitamura, T. et al., "Electrical toner movement for electronic paper-like display", Asia Display/IDW '01, pp. 1517-1520, Paper HCS1-1 (2001). Jan. 1, 2001.
Lee, Lawrence L., "Fabrication of Magnetic Particles Displays", Proceedings of the SID, vol. 18, 283 (1977) Jan. 1, 1977.
Lewis, J.C. et al.; "Gravitational, Inter-Particle and Particle-Electrode Forces in the Electrophoretic Display"; Proceedings of the SID; vol. 18, p. 235; 1977. Jan. 1, 1977.
Murau, P. et al.; "An Electrophoretic Radiographic Device"; SID 79 Digest; pp. 46-47; 1979. Jan. 1, 1979.
Murau, P. et al.; "The understanding and elimination of some suspension instabilities in an electrophoretic display"; J. Appl. Phys. vol. 49(9); p. 4820; Sep. 1978 Sep. 1, 1978.
O'Regan, B. et al., "A Low Cost, High-efficiency Solar Cell Based on Dye-sensitized colloidal $TiO_2$ Films", Nature, vol. 353, pp. 737-740 (Oct. 24, 1991). Oct. 24, 1991.
Ota, I., et al., "Electrophoretic Image Display (EPID) Panel", Proceedings of the IEEE, 61, 832 (1973) Dec. 31, 1973.
Pankove, Jacques I., "Color Reflection Type Display Panel", RCA Technical Notes, No. 535 (Mar. 1962). Mar. 1, 1962.
Pitt, M.G., et al., "Power Consumption of Microencapsulated Electrophoretic Displays for Smart Handheld Applications", SID 02 Digest, pp. 1378-1381 (2002). Dec. 31, 2002.
Saitoh, M. et al., "A newly developed electrical twisting ball display", Proceedings of the SID, vol. 23(4), pp. 249-253 (1982). Jan. 1, 1982.
Sheridon, N.K. et al., "The Gyricon—A Twisting Ball Display", Proceedings of the SID, vol. 18, p. 289 (1977). Jan. 1, 1977.
Vaz, Nuno A. et al., "Dual frequency addressing of polymer-dispersed liquid-crystal films", J. Appl. Phys., vol. 65, pp. 5043-5050 (1989). Jan. 1, 1989.
Vance, Dennis W.; "Optical Charateristics of Electrophoretic Displays"; Proceedings of the SID; vol. 18, p. 267; 1977. Jan. 1, 1977.
Webber, R., "Image Stability in Active-Matrix Microencapsulated Electrophoretic Displays", SID 02 Digest, pp. 126-129 (2002). Dec. 31, 2002.
Whitesides, T. et al., "Towards Video-rate Microencapsulated Dual-Particle Electrophoretic Displays", SID 04 Digest, 133 (2004) Dec. 31, 2004.

* cited by examiner

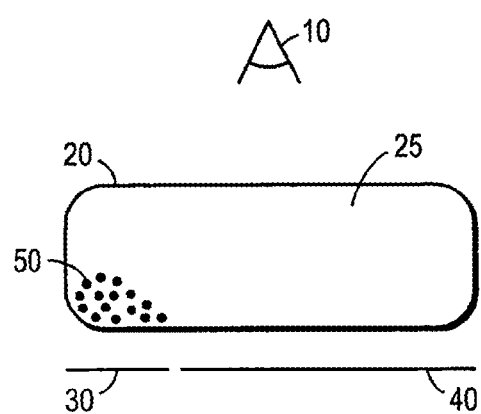 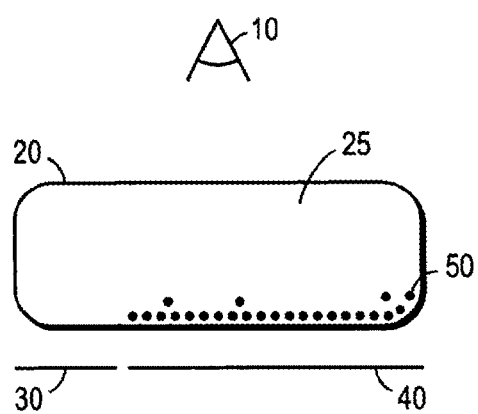
FIG. 1A  FIG. 1B
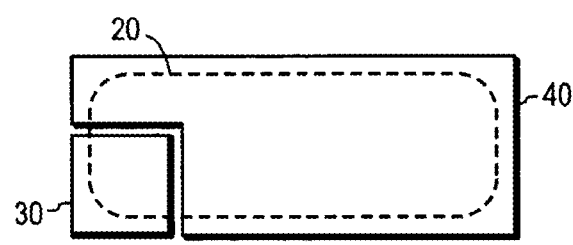
FIG. 1C

MULTI-COLOR ELECTROPHORETIC DISPLAYS

REFERENCE TO RELATED APPLICATIONS

This application is a continuation of application Ser. No. 14/987,191, filed Jan. 4, 2016, which is a continuation of application Ser. No. 13/892,517, filed May 13, 2013, now U.S. Pat. No. 9,268,191, issued Feb. 23, 2016, which is a divisional of application Ser. No. 13/251,457, filed Oct. 3, 2011 now U.S. Pat. No. 8,441,714, issued May 14, 2013, which is continuation of application Ser. No. 12/725,997, filed Mar. 17, 2010, now U.S. Pat. No. 8,040,594, issued Oct. 18, 2011, which is a continuation-in-part of application Ser. No. 12/117,974, filed May 9, 2008, now U.S. Pat. No. 7,791,789, issued Sep. 7, 2010, which is a continuation of application Ser. No. 11/970,811, filed Jan. 8, 2008, now U.S. Pat. No. 8,384,658, issued Feb. 26, 2013, which is a continuation of application Ser. No. 10/729,044, filed Dec. 5, 2003, now U.S. Pat. No. 7,352,353, issued Apr. 1, 2008, the contents of all of which are incorporated herein by reference.

BACKGROUND OF INVENTION

The present invention relates to multi-color electrophoretic media and to displays incorporating such media.

Traditionally, electronic displays such as liquid crystal displays have been made by sandwiching an optoelectrically active material between two pieces of glass. In many cases each piece of glass has an etched, clear electrode structure formed using indium tin oxide. A first electrode structure controls all the segments of the display that may be addressed, that is, changed from one visual state to another. A second electrode, sometimes called a counter electrode, addresses all display segments as one large electrode, and is generally designed not to overlap any of the rear electrode wire connections that are not desired in the final image. Alternatively, the second electrode is also patterned to control specific segments of the displays. In these displays, unaddressed areas of the display have a defined appearance.

Electrophoretic display media, generally characterized by the movement of particles through an applied electric field, are highly reflective, can be made bistable, and consume very little power. Such displays can have attributes of good brightness and contrast, wide viewing angles, state bistability, and low power consumption when compared with liquid crystal displays. Encapsulated electrophoretic displays also enable the display to be printed. These properties allow encapsulated electrophoretic display media to be used in many applications for which traditional electronic displays are not suitable, such as flexible displays. The electro-optical properties of encapsulated displays allow, and in some cases require, novel schemes or configurations to be used to address the displays. Accordingly, such displays have been the subject of intense research and development for a number of years.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Nevertheless, problems with the long-term image quality of non-encapsulated electrophoretic displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. No. 7,002,728; and U.S. Patent Application Publication No. 2007/0146310;

(b) Capsules, binders and encapsulation processes; see for example U.S. Pat. Nos. 6,922,276 and; 7,411,719;

(c) Films and sub-assemblies containing electro-optic materials; see for example U.S. Pat. No. 6,982,178; and U.S. Patent Application Publication No. 2007/0109219;

(d) Backplanes, adhesive layers and other auxiliary layers and methods used in displays; see for example U.S. Pat. No. 7,116,318; and U.S. Patent Application Publication No. 2007/0035808;

(e) Color formation and color adjustment; see for example U.S. Pat. Nos. 6,017,584; 6,664,944; 6,864,875; 7,075,502; and 7,167,155; and U.S. Patent Applications Publication Nos. 2004/0190114; 2004/0263947; 2007/0109219; 2007/0223079; 2008/0023332; 2008/0043318; and 2008/0048970;

(f) Methods for driving displays; see for example U.S. Pat. No. 7,012,600; and U.S. Patent Application Publication No. 2006/0262060;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see, for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

As already indicated, an encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Most prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be disposed over the viewing surface of the monochrome (black and white) display. Such a color filter array is typically of the red/green/blue ("RGB") or red/green/blue/white ("RGBW") type. Displays with color filters rely upon an area sharing approach with three (in the case of RGB displays) or four (in the case of RGBW displays) sub-pixels together functioning as a single full color pixel. Unfortunately, each color can only be displayed by part of the display area. For example, in an RGBW display, each of red, green and blue can only be displayed by ¼ of the display area (one sub-pixel out of four) and white can effectively be displayed by ½ of the display area (one complete sub-pixel out of four, plus each colored sub-pixel acts as ⅓ white, so the three colored sub-pixels together provide another one complete white sub-pixel). This area sharing approach result in colors less bright than is desirable.

Alternatively full color displays can be constructed using multiple color-changing layers, with at least one front (i.e., adjacent the viewing surface) color-changing layer operating in shutter mode. Apart from being complicated and potentially expensive, such a multi-layer display requires precise alignment of the various layers, and highly light transmissive electrodes (and transistors, in the case of an active matrix display).

The aforementioned U.S. Pat. No. 6,017,584 describes an electrophoretic medium having three different types of particles having three different colors in a colored or uncolored fluid, and a method of driving the particles so as to enable each of the three different colors to be displayed. The relevant disclosure from the aforementioned U.S. Pat. No. 6,017,584 is reproduced below with reference to FIGS. 6-9 of the accompanying drawings.

There is still, however, a need for electrophoretic media capable of displaying more colors at each pixel in order that, for example, such media can reproduce the appearance of high quality color printing. Such high quality printing is typically effected using at least four inks, cyan/magenta/yellow/black ("CMYK"). It is often not appreciated that a so-called "four-color" CMYK printing system is in reality a five-color system, the fifth color being the white background provided by the paper (or similar) surface when no ink is applied thereto. Since there is no comparable background color in an essentially opaque electrophoretic medium unless it is being used in shutter mode, a non-shutter mode electrophoretic medium should be capable of displaying five colors (black, white and three primary colors, the three primary colors typically being cyan, magenta and yellow. It has now been realized that by this aim can be achieved by using the electrophoretic medium from the aforementioned U.S. Pat. No. 6,017,584 having three different types of particles in a colored fluid and choosing the colors of both the particles and the fluid carefully.

SUMMARY OF INVENTION

An object of the invention is to provide a highly-flexible, reflective display which can be manufactured easily, consumes little (or no in the case of bistable displays) power, and can, therefore, be incorporated into a variety of applications. The invention features a printable display comprising an encapsulated electrophoretic display medium. The resulting display is flexible. Since the display media can be printed, the display itself can be made inexpensively.

An encapsulated electrophoretic display can be constructed so that the optical state of the display is stable for some length of time. When the display has two states which are stable in this manner, the display is said to be bistable. If more than two states of the display are stable, then the display can be said to be multistable. For the purpose of this invention, the term bistable will be used to indicate a display in which any optical state remains fixed once the addressing voltage is removed. The definition of a bistable state depends on the application for the display. A slowly-decaying optical state can be effectively bistable if the optical state is substantially unchanged over the required viewing time.

For example, in a display which is updated every few minutes, a display image which is stable for hours or days is effectively bistable for that application. In this invention, the term bistable also indicates a display with an optical state sufficiently long-lived as to be effectively bistable for the application in mind. Alternatively, it is possible to construct encapsulated electrophoretic displays in which the image decays quickly once the addressing voltage to the display is removed (i.e., the display is not bistable or multistable). As will be described, in some applications it is advantageous to use an encapsulated electrophoretic display which is not bistable. Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may comprise capsules dispersed in a binder. The capsules may be of any size or shape. The capsules may, for example, be spherical and may have diameters in the millimeter range or the micron range, but is preferably from ten to a few hundred microns. The capsules may be formed by an encapsulation technique, as described below. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further comprise a suspending fluid in which the particles are dispersed.

The successful construction of an encapsulated electrophoretic display requires the proper interaction of several different types of materials and processes, such as a polymeric binder and, optionally, a capsule membrane. These materials must be chemically compatible with the electrophoretic particles and fluid, as well as with each other. The capsule materials may engage in useful surface interactions with the electrophoretic particles, or may act as a chemical or physical boundary between the fluid and the binder.

In some cases, the encapsulation step of the process is not necessary, and the electrophoretic fluid may be directly dispersed or emulsified into the binder (or a precursor to the binder materials) and an effective "polymer-dispersed electrophoretic display" constructed. In such displays, voids created in the binder may be referred to as capsules or microcapsules even though no capsule membrane is present. The binder dispersed electrophoretic display may be of the emulsion or phase separation type.

Throughout the specification, reference will be made to printing or printed. As used throughout the specification, printing is intended to include all forms of printing and coating, including: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. A "printed element" refers to an element formed using any one of the above techniques.

This invention provides novel methods and apparatus for controlling and addressing particle-based displays. Additionally, the invention discloses applications of these methods and materials on flexible substrates, which are useful in large-area, low cost, or high-durability applications.

In one aspect, the present invention relates to an encapsulated electrophoretic display. The display includes a substrate and at least one capsule containing a highly-resistive fluid and a plurality of particles. The display also includes at least two electrodes disposed adjacent the capsule, a potential difference between the electrodes causing some of the particles to migrate toward at least one of the two electrodes. This causes the capsule to change optical properties.

In another aspect, the present invention relates to a colored electrophoretic display. The electrophoretic display includes a substrate and at least one capsule containing a highly-resistive fluid and a plurality of particles. The display also includes colored electrodes. Potential differences are applied to the electrodes in order to control the particles and present a colored display to a viewer.

In yet another aspect, the present invention relates to an electrostatically addressable display comprising a substrate, an encapsulated electrophoretic display adjacent the substrate, and an optional dielectric sheet adjacent the electrophoretic display. Application of an electrostatic charge to the dielectric sheet or display material modulates the appearance of the electrophoretic display.

In still another aspect, the present invention relates to an electrostatically addressable encapsulated display comprising a film and a pair of electrodes. The film includes at least one capsule containing an electrophoretic suspension. The pair of electrodes is attached to either side of the film. Application of an electrostatic charge to the film modulates the optical properties.

In still another aspect, the present invention relates to an electrophoretic display that comprises a conductive substrate, and at least one capsule printed on such substrate. Application of an electrostatic charge to the capsule modulates the optical properties of the display.

In still another aspect the present invention relates to a method for matrix addressing an encapsulated display. The method includes the step of providing three or more electrodes for each display cell and applying a sequence of potentials to the electrodes to control movement of particles within each cell.

In yet another aspect, the present invention relates to a matrix addressed electrophoretic display. The display includes a capsule containing charged particles and three or more electrodes disposed adjacent the capsule. A sequence of voltage potentials is applied to the three or more electrodes causing the charged particles to migrate within the capsule responsive to the sequence of voltage potentials.

In still another aspect, the present invention relates to a rear electrode structure for electrically addressable displays. The structure includes a substrate, a first electrode disposed on a first side of the substrate, and a conductor disposed on a second side of the substrate. The substrate defines at least one conductive via in electrical communication with both the first electrode and the conductor.

In yet another aspect, this invention provides a multicolor electrophoretic medium containing at least first, second and third species of particles, the particles having substantially non-overlapping electrophoretic mobilities and first, second and third colors respectively, the first, second and third colors differing from each other, the particles being dispersed in a fluid having a fourth color different from the first, second and third colors.

In such a multi-color medium, the first, second, third and fourth colors may be cyan, magenta, yellow and white, in any order. Since it is very difficult to make a satisfactory white (light-scattering) fluid, it is generally preferred that one of the three types of particles have a white color. As already noted, the first, second and third types of particles must having differing (and non-zero) electrophoretic mobilities. Although in principle all three types of particles could bear charges of the same polarity but differing magnitudes to provide the differing electrophoretic mobilities, it is generally more convenient to have two types of particles bearing charges of one polarity, with the other type of particles bear charges of the opposite polarity. When, as in one preferred form of the invention, one of the three types of particles is white, it is preferred that the white particle bear charges of one polarity and that the other two types of particles (conveniently cyan and magenta) bear charges of the opposite polarity.

As already mentioned, many preferred embodiments of the invention will have three types of particles colored white and two other colors. Both transmissive and reflective colored particles can be used in the present invention. White particles operate by scattering light and hence are essentially reflective; a "transmissive" white particle would be essentially transparent and hence not useful in the present invention. However, as illustrated in the drawings and described below, both transmissive and reflective particles having colors other than white can be used, although the positioning of the various particles, and especially the positioning of the white particles, needed to produce various colors varies depending upon whether transmissive or reflective non-white particles are used.

The electrophoretic medium of the present invention may be of the encapsulated type and comprise a capsule wall within which the fluid and the electrically charged particles are retained. Such an encapsulated medium may comprise a plurality of capsules each comprising a capsule wall, with the fluid and electrically charged particle retained therein, the medium further comprising a polymeric binder surrounding the capsules. Alternatively, the medium may be of the microcell or polymer-dispersed types discussed above.

This invention extends to an electrophoretic display comprising an electrophoretic medium of the present invention and at least one electrode disposed adjacent the electrophoretic medium for applying an electric field to the medium. The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

In yet another aspect, this invention provides a method of driving a multi-color electrophoretic display containing at least first, second and third species of particles, the particles having substantially non-overlapping electrophoretic mobilities and first, second and third colors respectively, the first, second and third colors differing from each other, the particles being dispersed in a fluid having a fourth color different from the first, second and third colors, the display further comprising a first electrode forming a viewing surface of the display and a second electrode on the opposed side of the fluid from the first electrode, the method comprising:
  bringing all three species of particles adjacent one of the first and second electrodes;
  applying an electric field between the first and second electrodes to cause at least one species of particles to move away from said one electrode, thereby placing a desired one of the three species of particles adjacent the viewing surface; and
  applying an electric field between the first and second electrodes to cause all three species of particles to move away from the first electrode, whereby the fourth color of the fluid is displayed at the viewing surface.

BRIEF DESCRIPTION OF DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 1A is a diagrammatic side view of an embodiment of a rear-addressing electrode structure for a particle-based display in which the smaller electrode has been placed at a voltage relative to the large electrode causing the particles to migrate to the smaller electrode.

FIG. 1B is a diagrammatic side view of an embodiment of a rear-addressing electrode structure for a particle-based display in which the larger electrode has been placed at a voltage relative to the smaller electrode causing the particles to migrate to the larger electrode.

FIG. 1C is a diagrammatic top-down view of one embodiment of a rear-addressing electrode structure.

DETAILED DESCRIPTION

Figure 2A:
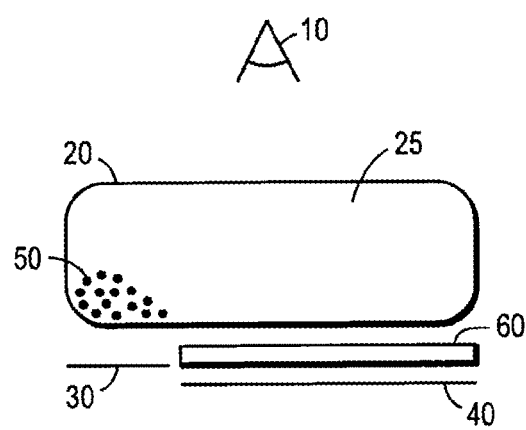
FIG. 2A is a diagrammatic side view of an embodiment of a rear-addressing electrode structure having a retroreflective layer associated with the larger electrode in which the smaller electrode has been placed at a voltage relative to the large electrode causing the particles to migrate to the smaller electrode.

An electronic ink is an optoelectronically active material which comprises at least two phases: an electrophoretic contrast media phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase between the two phases. The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate. An electronic ink is capable of being printed by several different processes, depending on the mechanical properties of the specific ink employed. For example, the fragility or viscosity of a particular ink may result in a different process selection. A very viscous ink would not be well-suited to deposition by an inkjet printing process, while a fragile ink might not be used in a knife over roll coating process.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material. Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered indium tin oxide (ITO) conductors, a standard material in liquid crystal devices, is not required. Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include semiconducting colloids, examples of which are indium tin oxide and antimony-doped tin oxide. Organic conductors (polymeric conductors and molecular organic conductors) also may be used. Polymers include, but are not limited to, polyaniline and derivatives, polythiophene and derivatives, poly(3,4-ethylenedioxythiophene) (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

As an example, there are classes of materials called electroconductive powders which are also useful as coatable transparent conductors in electronic ink displays. One example is Zelec ECP electroconductive powders from DuPont Chemical Co. of Wilmington, Del.

Referring now to FIGS. 1A and 1B, an addressing scheme for controlling particle-based displays is shown in which electrodes are disposed on only one side of a display, allowing the display to be rear-addressed. Utilizing only one side of the display for electrodes simplifies fabrication of displays. For example, if the electrodes are disposed on only the rear side of a display, both of the electrodes can be fabricated using opaque materials, because the electrodes do not need to be transparent.

FIG. 1A depicts a single capsule 20 of an encapsulated display media. In brief overview, the embodiment depicted in FIG. 1A includes a capsule 20 containing at least one particle 50 dispersed in a suspending fluid 25. The capsule 20 is addressed by a first electrode 30 and a second electrode 40. The first electrode 30 is smaller than the second electrode 40. The first electrode 30 and the second electrode 40 may be set to voltage potentials which affect the position of the particles 50 in the capsule 20.

The particles 50 represent 0.1% to 20% of the volume enclosed by the capsule 20. In some embodiments the particles 50 represent 2.5% to 17.5% of the volume enclosed by capsule 20. In preferred embodiments, the particles 50 represent 5% to 15% of the volume enclosed by the capsule 20. In more preferred embodiments the particles 50 represent 9% to 11% of the volume defined by the capsule 20. In general, the volume percentage of the capsule 20 that the particles 50 represent should be selected so that the particles 50 expose most of the second, larger electrode 40 when positioned over the first, smaller electrode 30. As described in detail below, the particles 50 may be colored any one of a number of colors. The particles 50 may be either positively charged or negatively charged.

The particles 50 are dispersed in a dispersing fluid 25. The dispersing fluid 25 should have a low dielectric constant. The fluid 25 may be clear, or substantially clear, so that the fluid 25 does not inhibit viewing the particles 50 and the electrodes 30, 40 from position 10. In other embodiments, the fluid 25 is dyed. In some embodiments the dispersing fluid 25 has a specific gravity matched to the density of the particles 50. These embodiments can provide a bistable display media, because the particles 50 do not tend to move in certain compositions absent an electric field applied via the electrodes 30, 40.

The electrodes 30, 40 should be sized and positioned appropriately so that together they address the entire capsule 20. There may be exactly one pair of electrodes 30, 40 per capsule 20, multiple pairs of electrodes 30, 40 per capsule 20, or a single pair of electrodes 30, 40 may span multiple capsules 20. In the embodiment shown in FIGS. 1A and 1B, the capsule 20 has a flattened, rectangular shape. In these embodiments, the electrodes 30, 40 should address most, or all, of the flattened surface area adjacent the electrodes 30, 40. The smaller electrode 30 is at most one-half the size of the larger electrode 40. In preferred embodiments the smaller electrode is one-quarter the size of the larger electrode 40; in more preferred embodiments the smaller electrode 30 is one-eighth the size of the larger electrode 40. In even more preferred embodiments, the smaller electrode 30 is one-sixteenth the size of the larger electrode 40. It should be noted that reference to "smaller" in connection with the electrode 30 means that the electrode 30 addresses a smaller amount of the surface area of the capsule 20, not necessarily that the electrode 30 is physically smaller than the larger electrode 40. For example, multiple capsules 20 may be positioned such that less of each capsule 20 is addressed by the "smaller" electrode 30, even though both electrodes 30, 40 are equal in size. It should also be noted that, as shown in FIG. 1C, electrode 30 may address only a small corner of a rectangular capsule 20 (shown in phantom view in FIG. 1C), requiring the larger electrode 40 to surround the smaller electrode 30 on two sides in order to properly address the capsule 20. Selection of the percentage volume of the particles 50 and the electrodes 30, 40 in this manner allow the encapsulated display media to be addressed as described below.

Electrodes may be fabricated from any material capable of conducting electricity so that electrode 30, 40 may apply an electric field to the capsule 20. As noted above, the rear-addressed embodiments depicted in FIGS. 1A and 1B allow the electrodes 30, 40 to be fabricated from opaque materials such as solder paste, copper, copper-clad polyimide, graphite inks, silver inks and other metal-containing conductive inks. Alternatively, electrodes may be fabricated using transparent materials such as indium tin oxide and conductive polymers such as polyaniline or polythiophenes. Electrodes 30, 40 may be provided with contrasting optical properties. In some embodiments, one of the electrodes has an optical property complementary to optical properties of the particles 50.

In one embodiment, the capsule 20 contains positively charged black particles 50, and a substantially clear suspending fluid 25. The first, smaller electrode 30 is colored black, and is smaller than the second electrode 40, which is colored white or is highly reflective. When the smaller, black electrode 30 is placed at a negative voltage potential relative to larger, white electrode 40, the positively-charged particles 50 migrate to the smaller, black electrode 30. The effect to a viewer of the capsule 20 located at position 10 is a mixture of the larger, white electrode 40 and the smaller, black electrode 30, creating an effect which is largely white. Referring to FIG. 1B, when the smaller, black electrode 30 is placed at a positive voltage potential relative to the larger, white electrode 40, particles 50 migrate to the larger, white electrode 40 and the viewer is presented a mixture of the black particles 50 covering the larger, white electrode 40 and the smaller, black electrode 30, creating an effect which is largely black. In this manner the capsule 20 may be addressed to display either a white visual state or a black visual state.

Other two-color schemes are easily provided by varying the color of the smaller electrode 30 and the particles 50 or by varying the color of the larger electrode 40. For example, varying the color of the larger electrode 40 allows fabrication of a rear-addressed, two-color display having black as one of the colors. Alternatively, varying the color of the smaller electrode 30 and the particles 50 allow a rear-addressed two-color system to be fabricated having white as one of the colors. Further, it is contemplated that the particles 50 and the smaller electrode 30 can be different colors. In these embodiments, a two-color display may be fabricated having a second color that is different from the color of the smaller electrode 30 and the particles 50. For example, a rear-addressed, orange-white display may be fabricated by providing blue particles 50, a red, smaller electrode 30, and a white (or highly reflective) larger electrode 40. In general, the optical properties of the electrodes 30, 40 and the particles 50 can be independently selected to provide desired display characteristics. In some embodiments the optical properties of the dispersing fluid 25 may also be varied, e.g. the fluid 25 may be dyed.

Figure 2B:
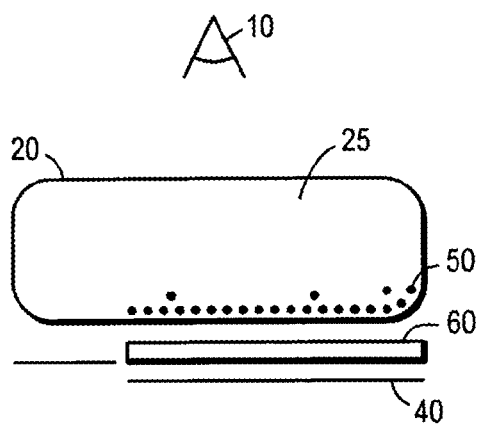
FIG. 2B is a diagrammatic side view of an embodiment of a rear-addressing electrode structure having a retroreflective layer associated with the larger electrode in which the larger electrode has been placed at a voltage relative to the smaller electrode causing the particles to migrate to the larger electrode.
Figure 2C:
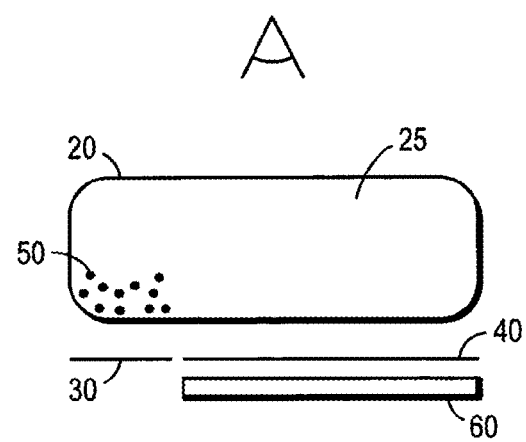
FIG. 2C is a diagrammatic side view of an embodiment of a rear-addressing electrode structure having a retroreflective layer disposed below the larger electrode in which the smaller electrode has been placed at a voltage relative to the large electrode causing the particles to migrate to the smaller electrode.
Figure 2D:
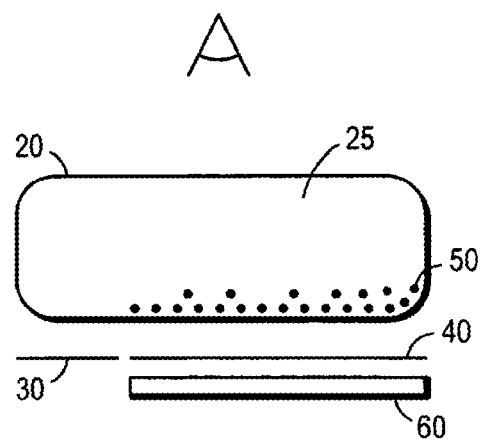
FIG. 2D is a diagrammatic side view of an embodiment of a rear-addressing electrode structure having a retroreflective layer disposed below the larger electrode in which the larger electrode has been placed at a voltage relative to the smaller electrode causing the particles to migrate to the larger electrode.

In other embodiments the larger electrode 40 may be reflective instead of white. In these embodiments, when the particles 50 are moved to the smaller electrode 30, light reflects off the reflective surface 60 associated with the larger electrode 40 and the capsule 20 appears light in color, e.g. white (see FIG. 2A). When the particles 50 are moved to the larger electrode 40, the reflecting surface 60 is obscured and the capsule 20 appears dark (see FIG. 2B) because light is absorbed by the particles 50 before reaching the reflecting surface 60. The reflecting surface 60 for the larger electrode 40 may possess retroflective properties, specular reflection properties, diffuse reflective properties or gain reflection properties. In certain embodiments, the reflective surface 60 reflects light with a Lambertian distribution. The surface 60 may be provided as a plurality of glass spheres disposed on the electrode 40, a diffractive reflecting layer such as a holographically formed reflector, a surface patterned to totally internally reflect incident light, a brightness-enhancing film, a diffuse reflecting layer, an embossed plastic or metal film, or any other known reflecting surface. The reflecting surface 60 may be provided as a separate layer laminated onto the larger electrode 40 or the reflecting surface 60 may be provided as a unitary part of the larger electrode 40. In the embodiments depicted by FIGS. 2C and 2D, the reflecting surface may be disposed below the electrodes 30, 40 vis-à-vis the viewpoint 10. In these embodiments, electrode 30 should be transparent so that light may be reflected by surface 60. In other embodiments, proper switching of the particles may be accomplished with a combination of alternating-current (AC) and direct-current (DC) electric fields and described below in connection with FIGS. 3A-3D.

In still other embodiments, the rear-addressed display previously discussed can be configured to transition between largely transmissive and largely opaque modes of operation (referred to hereafter as "shutter mode"). Referring back to FIGS. 1A and 1B, in these embodiments the capsule 20 contains at least one positively-charged particle 50 dispersed in a substantially clear dispersing fluid 25. The larger electrode 40 is transparent and the smaller electrode 30 is opaque. When the smaller, opaque electrode 30 is placed at a negative voltage potential relative to the larger, transmissive electrode 40, the particles 50 migrate to the smaller, opaque electrode 30. The effect to a viewer of the capsule 20 located at position 10 is a mixture of the larger, transparent electrode 40 and the smaller, opaque electrode 30, creating an effect which is largely transparent. Referring to FIG. 1B, when the smaller, opaque electrode 30 is placed at a positive voltage potential relative to the larger, transparent electrode 40, particles 50 migrate to the second electrode 40 and the viewer is presented a mixture of the opaque particles 50 covering the larger, transparent electrode 40 and the smaller, opaque electrode 30, creating an effect which is largely opaque. In this manner, a display formed using the capsules depicted in FIGS. 1A and 1B may be switched between transmissive and opaque modes. Such a display can be used to construct a window that can be rendered opaque. Although FIGS. 1A-2D depict a pair of electrodes associated with each capsule 20, it should be understood that each pair of electrodes may be associated with more than one capsule 20.

Figure 3A:
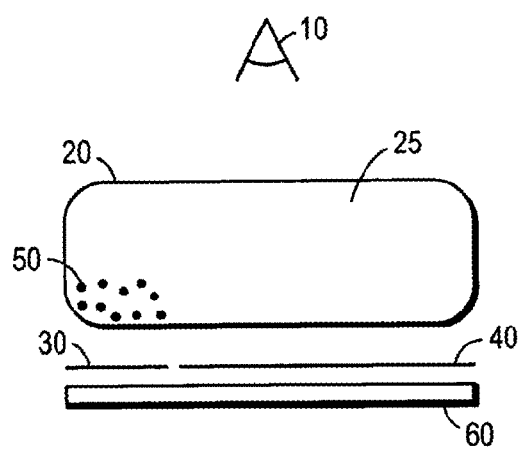
FIG. 3A is a diagrammatic side view of an embodiment of an addressing structure in which a direct-current electric field has been applied to the capsule causing the particles to migrate to the smaller electrode.

A similar technique may be used in connection with the embodiment of FIGS. 3A, 3B, 3C, and 3D. Referring to FIG. 3A, a capsule 20 contains at least one dark or black particle 50 dispersed in a substantially clear dispersing fluid 25. A smaller, opaque electrode 30 and a larger, transparent electrode 40 apply both direct-current (DC) electric fields and alternating-current (AC) fields to the capsule 20. A DC field can be applied to the capsule 20 to cause the particles 50 to migrate towards the smaller electrode 30. For example, if the particles 50 are positively charged, the smaller electrode is placed a voltage that is more negative than the larger electrode 40. Although FIGS. 3A-3D depict only one capsule per electrode pair, multiple capsules may be addressed using the same electrode pair.

The smaller electrode 30 is at most one-half the size of the larger electrode 40. In preferred embodiments the smaller electrode is one-quarter the size of the larger electrode 40; in more preferred embodiments the smaller electrode 30 is one-eighth the size of the larger electrode 40. In even more preferred embodiments, the smaller electrode 30 is one-sixteenth the size of the larger electrode 40.

Causing the particles 50 to migrate to the smaller electrode 30, as depicted in FIG. 3A, allows incident light to pass through the larger, transparent electrode 40 and be reflected by a reflecting surface 60. In shutter mode, the reflecting surface 60 is replaced by a translucent layer, a transparent layer, or a layer is not provided at all, and incident light is allowed to pass through the capsule 20, i.e. the capsule 20 is transmissive.

Figure 3B:
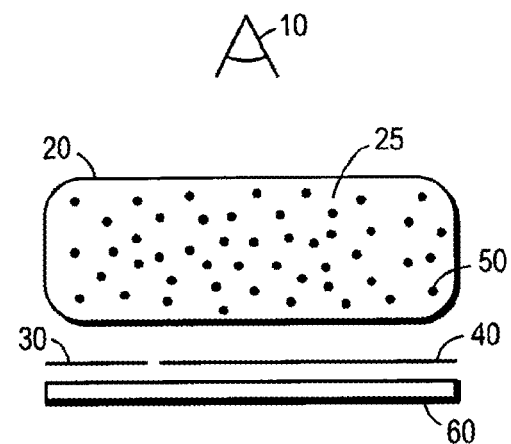
FIG. 3B is a diagrammatic side view of an embodiment of an addressing structure in which an alternating-current electric field has been applied to the capsule causing the particles to disperse into the capsule.

Referring now to FIG. 3B, the particles 50 are dispersed into the capsule 20 by applying an AC field to the capsule 20 via the electrodes 30, 40. The particles 50, dispersed into the capsule 20 by the AC field, block incident light from passing through the capsule 20, causing it to appear dark at the viewpoint 10. The embodiment depicted in FIGS. 3A-3B may be used in shutter mode by not providing the reflecting surface 60 and instead providing a translucent layer, a transparent layer, or no layer at all. In shutter mode, application of an AC electric field causes the capsule 20 to appear opaque. The transparency of a shutter mode display formed by the apparatus depicted in FIGS. 3A-3D may be controlled by the number of capsules addressed using DC fields and AC fields. For example, a display in which every other capsule 20 is addressed using an AC field would appear fifty percent transmissive.

Figure 3C:
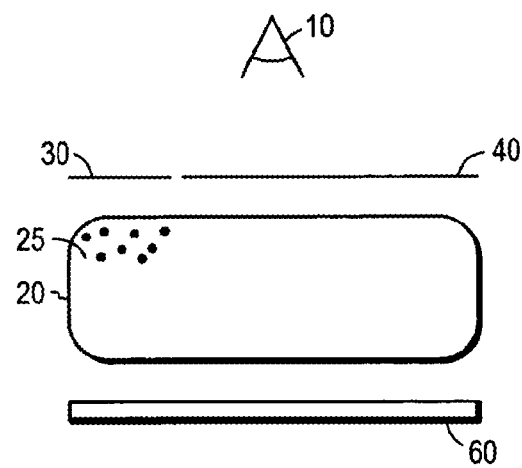
FIG. 3C is a diagrammatic side view of an embodiment of an addressing structure having transparent electrodes, in which a direct-current electric field has been applied to the capsule causing the particles to migrate to the smaller electrode.
Figure 3D:
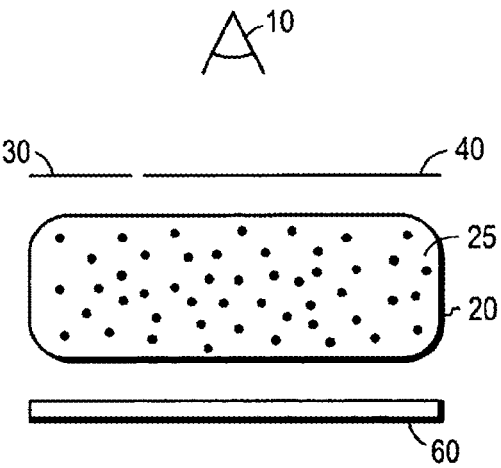
FIG. 3D is a diagrammatic side view of an embodiment of an addressing structure having transparent electrodes, in which an alternating-current electric field has been applied to the capsule causing the particles to disperse into the capsule.

FIGS. 3C and 3D depict an embodiment of the electrode structure described above in which electrodes 30, 40 are on "top" of the capsule 20, that is, the electrodes 30, 40 are between the viewpoint 10 and the capsule 20. In these embodiments, both electrodes 30, 40 should be transparent. Transparent polymers can be fabricated using conductive polymers, such as polyaniline, polythiophenes, or indium tin oxide. These materials may be made soluble so that electrodes can be fabricated using coating techniques such as spin coating, spray coating, meniscus coating, printing techniques, forward and reverse roll coating and the like. In these embodiments, light passes through the electrodes 30, 40 and is either absorbed by the particles 50, reflected by retroreflecting layer 60 (when provided), or transmitted throughout the capsule 20 (when retroreflecting layer 60 is not provided).

The addressing structure depicted in FIGS. 3A-3D may be used with electrophoretic display media and encapsulated electrophoretic display media. FIGS. 3A-3D depict embodiments in which electrode 30, 40 are statically attached to the display media. In certain embodiments, the particles 50 exhibit bistability, that is, they are substantially motionless in the absence of a electric field. In these embodiments, the electrodes 30, 40 may be provided as part of a "stylus" or other device which is scanned over the material to address each capsule or cluster of capsules. This mode of addressing particle-based displays will be described in more detail below in connection with FIG. 16.

Figure 4A:
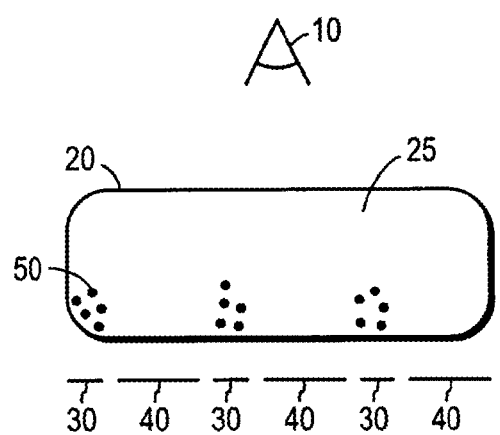
FIG. 4A is a diagrammatic side view of an embodiment of a rear-addressing electrode structure for a particle-based display in which multiple smaller electrodes have been placed at a voltage relative to multiple larger electrodes, causing the particles to migrate to the smaller electrodes.
Figure 4B:
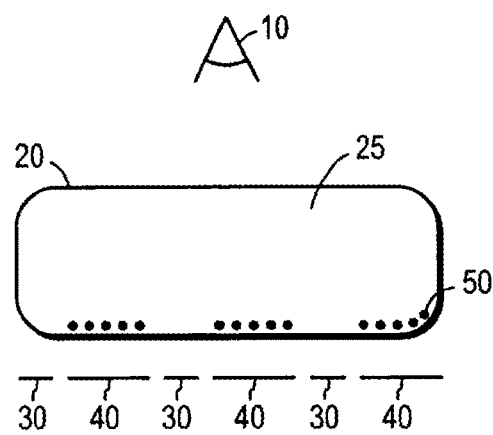
FIG. 4B is a diagrammatic side view of an embodiment of a rear-addressing electrode structure for a particle-based display in which multiple larger electrodes have been placed at a voltage relative to multiple smaller electrodes, causing the particles to migrate to the larger electrodes.

Referring now to FIGS. 4A and 4B, a capsule 20 of a electronically addressable media is illustrated in which the technique illustrated above is used with multiple rear-addressing electrodes. The capsule 20 contains at least one particle 50 dispersed in a clear suspending fluid 25. The capsule 20 is addressed by multiple smaller electrodes 30 and multiple larger electrodes 40. In these embodiments, the smaller electrodes 30 should be selected to collectively be at most one-half the size of the larger electrodes 40. In further embodiments, the smaller electrodes 30 are collectively one-fourth the size of the larger electrodes 40. In further embodiments the smaller electrodes 30 are collectively one-eighth the size of the larger electrodes 40. In preferred embodiments, the smaller electrodes 30 are collectively one-sixteenth the size of the larger electrodes. Each electrode 30 may be provided as separate electrodes that are controlled in parallel to control the display. For example, each separate electrode may be substantially simultaneously set to the same voltage as all other electrodes of that size. Alternatively, the electrodes 30, 40 may be interdigitated to provide the embodiment shown in FIGS. 4A and 4B.

Operation of the rear-addressing electrode structure depicted in FIGS. 4A and 4B is similar to that described above. For example, the capsule 20 may contain positively charged, black particles 50 dispersed in a substantially clear suspending fluid 25. The smaller electrodes 30 are colored black and the larger electrodes 40 are colored white or are highly reflective. Referring to FIG. 4A, the smaller electrodes 30 are placed at a negative potential relative to the larger electrodes 40, causing particles 50 migrate within the capsule to the smaller electrodes 30 and the capsule 20 appears to the viewpoint 10 as a mix of the larger, white electrodes 40 and the smaller, black electrodes 30, creating an effect which is largely white. Referring to FIG. 4B, when the smaller electrodes 30 are placed at a positive potential relative to the larger electrodes 40, particles 50 migrate to the larger electrodes 40 causing the capsule 20 to display a mix of the larger, white electrodes 40 occluded by the black particles 50 and the smaller, black electrodes 30, creating an effect which is largely black. The techniques described above with respect to the embodiments depicted in FIGS. 1A and 1B for producing two-color displays work with equal effectiveness in connection with these embodiments.

Figure 5A:
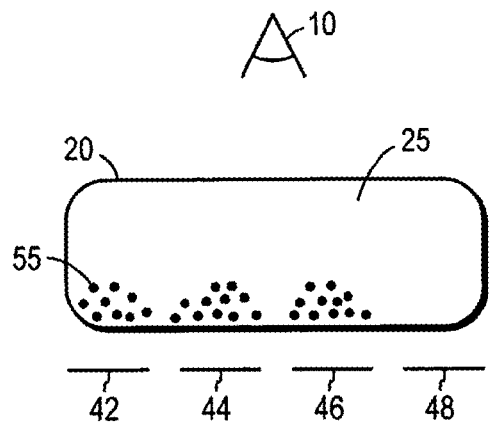
FIG. 5A is a diagrammatic side view of an embodiment of a rear-addressing electrode structure for a particle-based display having colored electrodes and a white electrode, in which the colored electrodes have been placed at a voltage relative to the white electrode causing the particles to migrate to the colored electrodes.
Figure 5B:
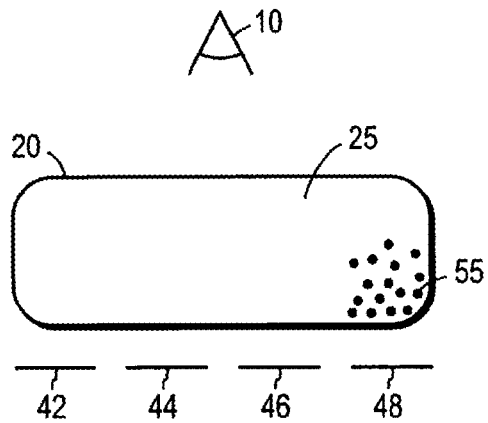
FIG. 5B is a diagrammatic side view of an embodiment of a rear-addressing electrode structure for a particle-based display having colored electrodes and a white electrode, in which the white electrode has been placed at a voltage relative to the colored electrodes causing the particles to migrate to the white electrode.

FIGS. 5A and 5B depict an embodiment of a rear-addressing electrode structure that creates a reflective color display in a manner similar to halftoning or pointillism. The capsule 20 contains white particles 55 dispersed in a clear suspending fluid 25. Electrodes 42, 44, 46, 48 are colored cyan, magenta, yellow, and white respectively. Referring to FIG. 5A, when the colored electrodes 42, 44, 46 are placed at a positive potential relative to the white electrode 48, negatively-charged particles 55 migrate to these three electrodes, causing the capsule 20 to present to the viewpoint 10 a mix of the white particles 55 and the white electrode 48, creating an effect which is largely white. Referring to FIG. 5B, when electrodes 42, 44, 46 are placed at a negative potential relative to electrode 48, particles 55 migrate to the white electrode 48, and the eye 10 sees a mix of the white particles 55, the cyan electrode 42, the magenta electrode 44, and the yellow electrode 46, creating an effect which is largely black or gray. By addressing the electrodes, any color can be produced that is possible with a subtractive color process. For example, to cause the capsule 20 to display an orange color to the viewpoint 10, the yellow electrode 46 and the magenta electrode 42 are set to a voltage potential that is more positive than the voltage potential applied by the cyan electrode 42 and the white electrode 48. Further, the relative intensities of these colors can be controlled by the actual voltage potentials applied to the electrodes.

Figure 6:
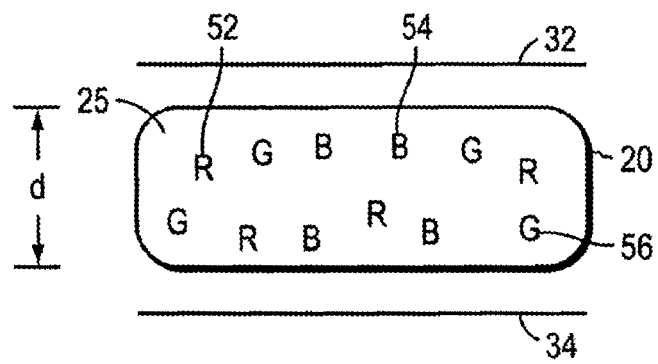
FIG. 6 is a diagrammatic side view of an embodiment of a color display element having red, green, and blue particles of different electrophoretic mobilities.

In another embodiment, depicted in FIG. 6, a color display is provided by a capsule 20 of size d containing multiple species of particles in a clear, dispersing fluid 25. Each species of particles has different optical properties and possess different electrophoretic mobilities (μ) from the other species. In the embodiment depicted in FIG. 6, the capsule 20 contains red particles 52, blue particles 54, and green particles 56, and $$|\mu_R|\rangle |\mu_B|\rangle |\mu_G|$$

That is, the magnitude of the electrophoretic mobility of the red particles 52, on average, exceeds the electrophoretic mobility of the blue particles 54, on average, and the electrophoretic mobility of the blue particles 54, on average, exceeds the average electrophoretic mobility of the green particles 56. As an example, there may be a species of red particle with a zeta potential of 100 millivolts (mV), a blue particle with a zeta potential of 60 mV, and a green particle with a zeta potential of 20 mV. The capsule 20 is placed between two electrodes 32, 42 that apply an electric field to the capsule.

Figure 7A:
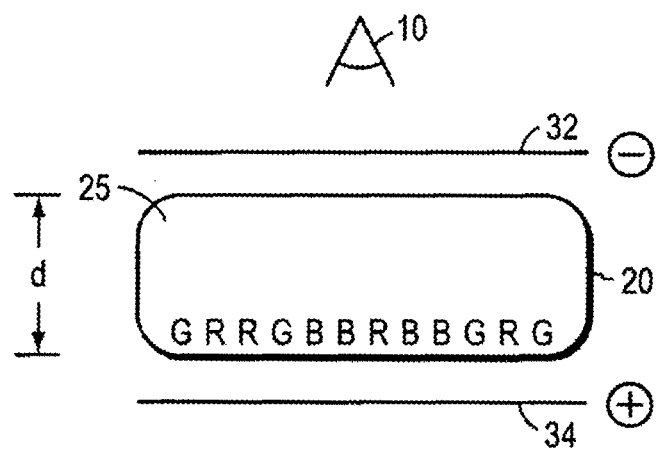
FIGS. 7A-7B depict the steps taken to address the display of FIG. 6 to display red.
Figure 7B:
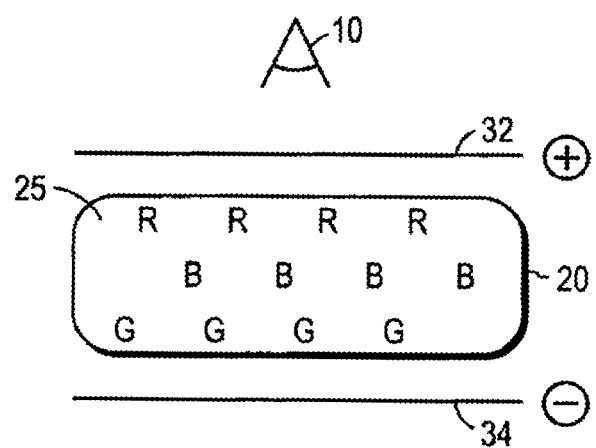

FIGS. 7A-7B depict the steps to be taken to address the display shown in FIG. 6 to display a red color to a viewpoint 10. Referring to FIG. 7A, all the particles 52, 54, 56 are attracted to one side of the capsule 20 by applying an electric field in one direction. The electric field should be applied to the capsule 20 long enough to attract even the more slowly moving green particles 56 to the electrode 34. Referring to FIG. 7B, the electric field is reversed just long enough to allow the red particles 52 to migrate towards the electrode 32. The blue particles 54 and green particles 56 will also move in the reversed electric field, but they will not move as fast as the red particles 52 and thus will be obscured by the red particles 52. The amount of time for which the applied electric field must be reversed can be determined from the relative electrophoretic mobilities of the particles, the strength of the applied electric field, and the size of the capsule.

Figure 8A:
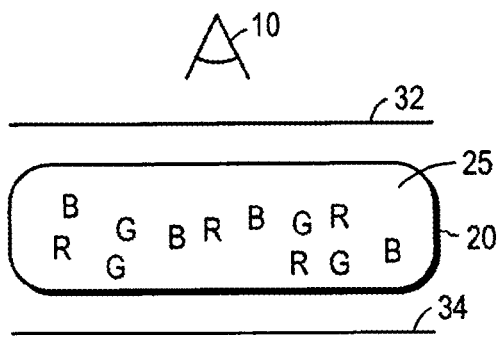
FIGS. 8A-8D depict the steps taken to address the display of FIG. 6 to display blue.
Figure 8B:
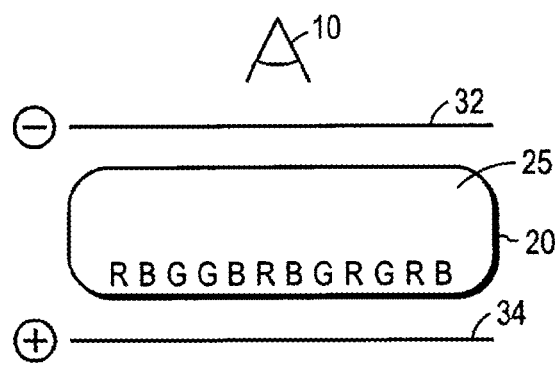
Figure 8C:
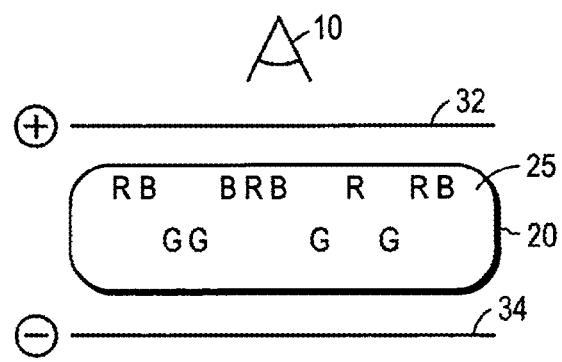
Figure 8D:
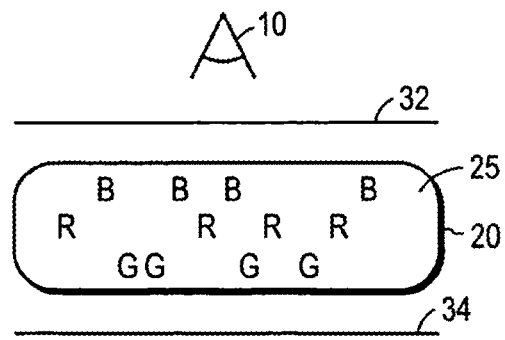

FIGS. 8A-8D depict addressing the display element to a blue state. As shown in FIG. 8A, the particles 52, 54, 56 are initially randomly dispersed in the capsule 20. All the particles 52, 54, 56 are attracted to one side of the capsule 20 by applying an electric field in one direction (shown in FIG. 8B). Referring to FIG. 8C, the electric field is reversed just long enough to allow the red particles 52 and blue particles 54 to migrate towards the electrode 32. The amount of time for which the applied electric field must be reversed can be determined from the relative electrophoretic mobilities of the particles, the strength of the applied electric field, and the size of the capsule. Referring to FIG. 8D, the electric field is then reversed a second time and the red particles 52, moving faster than the blue particles 54, leave the blue particles 54 exposed to the viewpoint 10. The amount of time for which the applied electric field must be reversed can be determined from the relative electrophoretic mobilities of the particles, the strength of the applied electric field, and the size of the capsule.

Figure 9A:
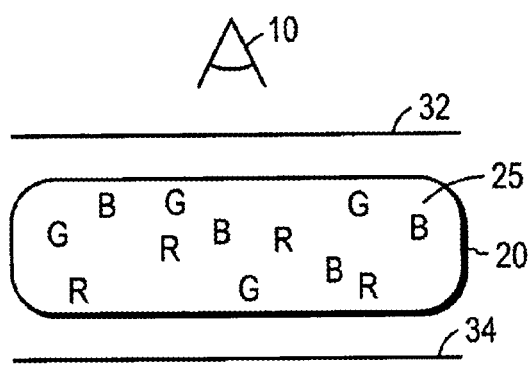
FIGS. 9A-9C depict the steps taken to address the display of FIG. 6 to display green.
Figure 9B:
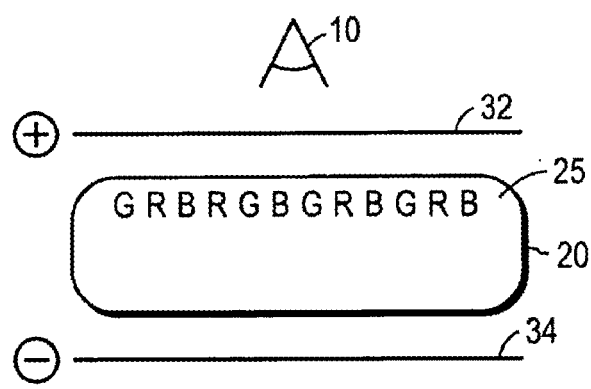
Figure 9C:
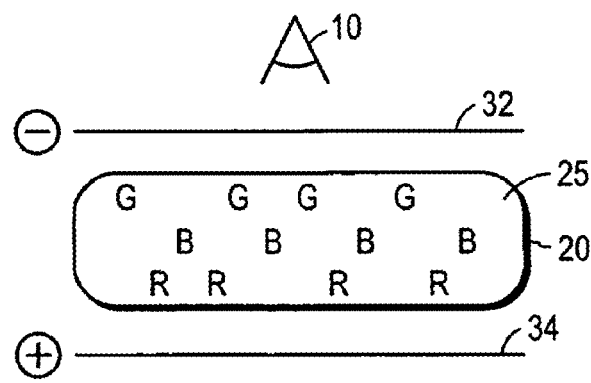

FIGS. 9A-9C depict the steps to be taken to present a green display to the viewpoint 10. As shown in FIG. 9A, the particles 52, 54, 56 are initially distributed randomly in the capsule 20. All the particles 52, 54, 56 are attracted to the side of the capsule 20 proximal the viewpoint 10 by applying an electric field in one direction. The electric field should be applied to the capsule 20 long enough to attract even the more slowly moving green particles 56 to the electrode 32. As shown in FIG. 9C, the electric field is reversed just long enough to allow the red particles 52 and the blue particles 54 to migrate towards the electrode 54, leaving the slowly-moving green particles 56 displayed to the viewpoint. The amount of time for which the applied electric field must be reversed can be determined from the relative electrophoretic mobilities of the particles, the strength of the applied electric field, and the size of the capsule.

In other embodiments, the capsule contains multiple species of particles and a dyed dispersing fluid that acts as one of the colors. In still other embodiments, more than three species of particles may be provided having additional colors. Although FIGS. 6-9C depict two electrodes associated with a single capsule, the electrodes may address multiple capsules or less than a full capsule.

FIGS. 10A-10H illustrate a capsule 120 having a capsule wall 124 and containing three different species of particles differing in color and electrophoretic mobility and dispersed in a colored fluid 125. As in FIGS. 6-9, the capsule 120 is provided with light transmissive front and rear electrodes 32 and 34 respectively on opposed sides thereof, with the front electrode 32 providing the viewing surface of the capsule. More specifically, the capsule 120 comprises negatively charged white particles (denoted W−), and positively charged cyan and magenta particles, with the cyan particles (denoted +C+) having a higher electrophoretic mobility than the magenta particles (denoted M+). The fluid 125 is colored with a yellow dye. The concentration of yellow dye should be chosen such that the yellow optical state of the display (described below with reference to FIG. 10D) provides a sufficiently saturated yellow color, but the yellow does not substantially contaminate other colors when electrophoretic particles lie adjacent the front electrode 32. The white W−, cyan +C+ and magenta M+ particles are all reflective. The yellow color of the dyed fluid is apparent only when there are no electrophoretic particles adjacent the front electrode 32. For example, if the white particles W− are driven adjacent the front electrode 32, the yellow color of the fluid 125 is not visible because the path of light (which enters through the front electrode 32, is reflected from the white particles W− and passes back through the front electrode 32) through the colored fluid is very short. If, however, the white particles W− are spaced from the front electrode 32 by a sufficient display (perhaps ¼ of the thickness of the fluid layer) the yellow color of the dyed fluid 125 will become visible as the path of reflected light through the fluid becomes substantial. The effect is similar to that in prior art single particle/dyed fluid electrophoretic displays.

As already noted, the cyan +C+ and magenta M+ particles are both positively charged but have differing electrophoretic mobilities; the present description will assume that the cyan particles have the higher mobility but obviously the reverse could be the case.

The capsule 120 is capable of displaying white, cyan, magenta, yellow, red, green, blue and black colors at its viewing surface (the front electrode 32), as illustrated in FIGS. 10A-10G respectively. To display a white color, the rear electrode 34 is simply made negative relative to the front electrode 32 for an extended period (all references hereinafter to making the rear electrode 34 negative or positive refer to making this rear electrode negative or positive relative to the front electrode 32, since typically in practice the front electrode 32 will be a common front electrode extending across the whole display, while the rear electrode 34 will be one of a multitude of individually controllable pixel electrodes), so that the white particles W− lie adjacent the front electrode 32 and the cyan +C+ and magenta M+ particles lie adjacent the rear electrode 34. In this situation, the white particles W− mask the cyan +C+ and magenta M+ particles and the yellow color of the fluid 125 (as previously noted, the pass length of light through the fluid 125 is too short for any appreciable contamination of the white color of the white particles W− by the yellow color of the fluid), so that a white color is displayed at the viewing surface of the display.

Figure 10A:
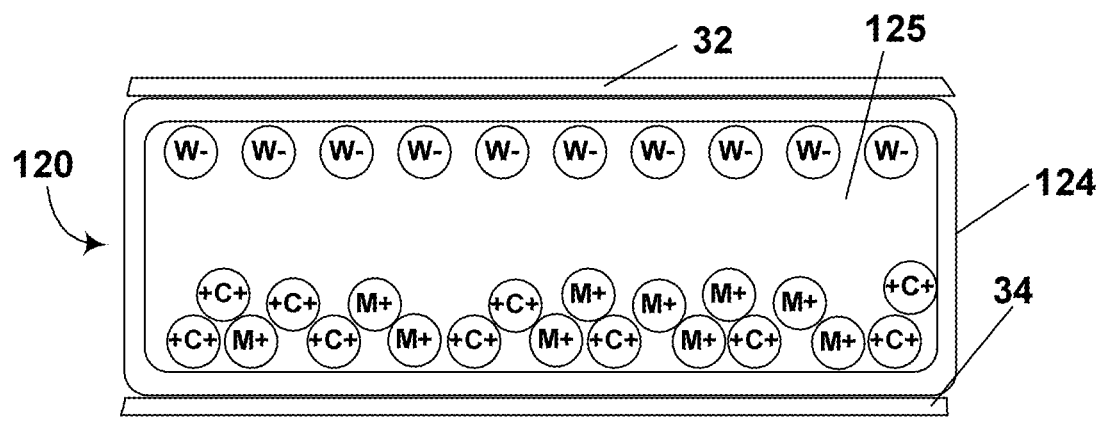
FIGS. 10A-10H depict a color display element having white, cyan and magenta particles of different electrophoretic mobilities in a yellow colored fluid, the cyan and magenta particles being reflective, and illustrate respectively, the white, cyan, magenta, yellow, red, green, blue and black optical states of the display.
Figure 10B:
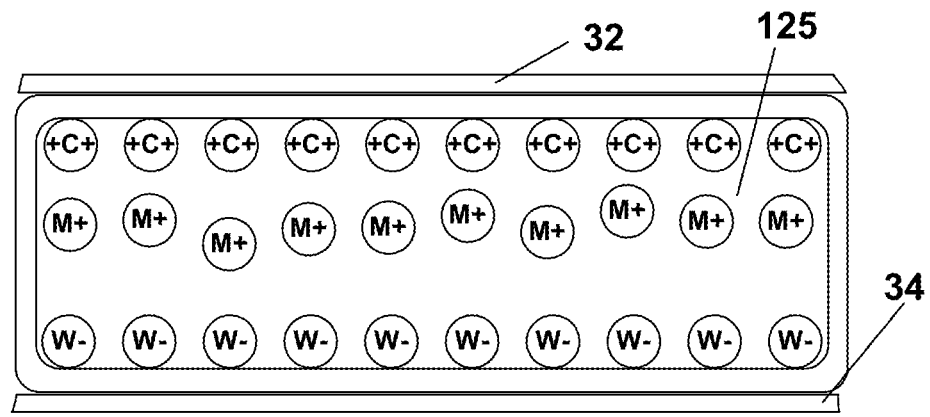

To produce a cyan color, as illustrated in FIG. 10B, one first applies a negative pulse to rear electrode 34 (which brings about substantially the same situation as in FIG. 10A, with the white particles W− adjacent the front electrode 32 and the cyan +C+ and magenta M+ particles adjacent the rear electrode 34), followed by a positive pulse shorter than the negative pulse. The positive pulse causes the white particles W− to approach the rear electrode 34 and both the cyan +C+ and magenta M+ particles to approach the front electrode 32. However, because of the greater mobility of the cyan +C+ particles, they approach the front electrode 32 more rapidly and the length of the positive pulse is chosen so that the cyan +C+ particles reach the front electrode 32 but the magenta particles M+ do not; in colloquial terms, the cyan particles "outrace" the magenta particles. In the situation shown in FIG. 10B, the cyan particles +C+ mask the magenta M+ and white W− particles and the yellow color of the fluid 125 (as previously noted, the pass length of light through the fluid 125 is too short for any appreciable contamination of the cyan color of the cyan particles +C+ by the yellow color of the fluid), so that a cyan color is displayed at the viewing surface of the display.

Figure 10C:
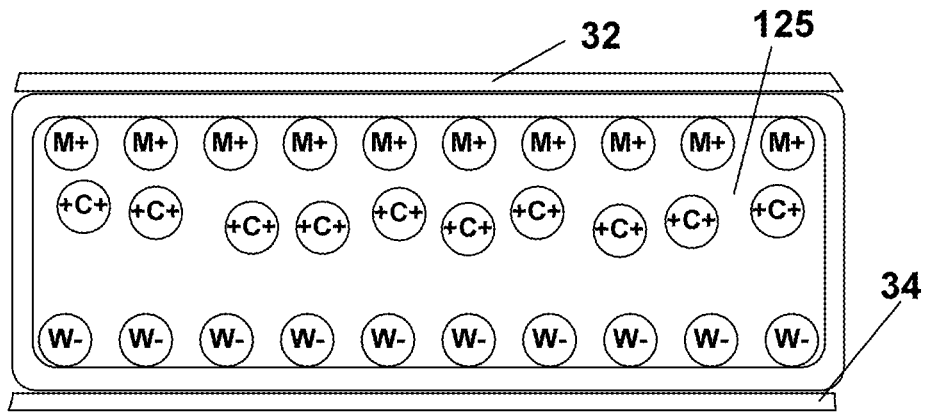

To produce a magenta color, as illustrated in FIG. 10C, one first applies a long positive pulse, which brings both the cyan particles +C+ and the magenta particles M+ adjacent the front electrode 32 and the white particles adjacent the rear electrode 34. There is then applied a very short negative pulse, which causes both the cyan particles +C+ and the magenta particles M+ to move away from the front electrode 32. However, because of the greater mobility of the cyan particles +C+, they move away from the front electrode 32 more rapidly than the magenta particles M+, leaving the magenta particles visible through the front electrode 32 and screening the cyan particles C+, the white particles W− and the yellow color of the fluid 125. The duration of the short negative pulse is chosen such that the pass length of light through the fluid 125 is too short for any appreciable contamination of the magenta color of the magenta particles M+ by the yellow color of the fluid. The short negative pulse also, of course, causes the white particles W− to move away from the rear electrode 34 but this has no effect on the color displayed.

Figure 10D:
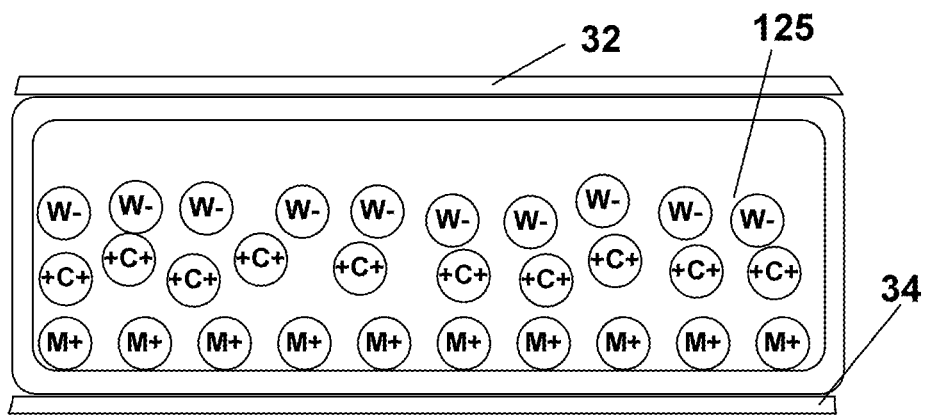

To produce a yellow color, as illustrated in FIG. 10D, one first applies a negative pulse, which brings about substantially the same situation as in FIG. 10A, with the white particles W−adjacent the front electrode 32 and the cyan +C+ and magenta M+ particles adjacent the rear electrode 34. One then applies a positive pulse, shorter than the negative pulse, to cause the white particles W− to move away from the front electrode 32 and the cyan +C+ and magenta particles to move away from the rear electrode 34. The length of the positive pulse is controlled so that the white particles W− remain closer to the front electrode 32 than the cyan +C+ and magenta particles but such that there is a substantial distance between the white particles W− and the front electrode 32. Thus, as illustrated in FIG. 10D, the white particles W− mask the cyan particles +C+ and the magenta particles M+. However, unlike the situation in FIG. 10A, in FIG. 10D the white particles are spaced a substantially distance from the front electrode 32 and act as a diffuse reflector causing light entering through the front electrode 32 and passing through the yellow fluid 125 to be reflected back through the yellow fluid 125 and the front electrode 32. Since this light has a substantial pass length through the yellow fluid 125, a yellow color is displayed.

Figure 10E:
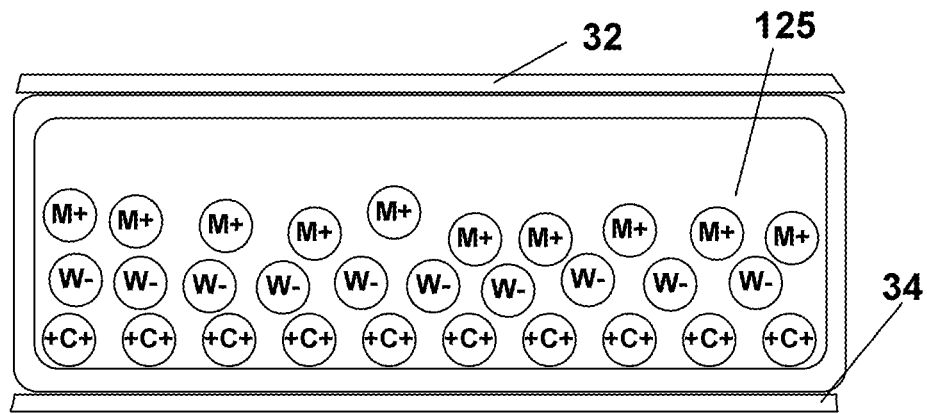

To display a red state, as illustrated in FIG. 10E, one first applies a relatively long positive pulse which, like the long positive pulse used in FIG. 10C, brings the cyan +C+ and magenta M+ particles adjacent the front electrode 32 and the white particles W− adjacent the rear electrode 34. Next, a negative pulse shorter than the initial positive pulse but longer than the negative pulse applied in FIG. 10C, is applied, and, for the same reasons as in FIG. 10C, causes the magenta particles M+ to be closest to the front electrode 32 and to mask the cyan particles +C+ and the white particles W−. However, the final negative pulse still leaves the magenta particles M+ substantially spaced from the front electrode 32, so that, for reasons similar to those discussed above in relation to FIG. 10D, the appearance of the display is affected by the yellow dye through which light reflected from the magenta particles M+ passes, and thus the appearance of the display is a combination of yellow dye absorption and magenta reflection, giving a red appearance.

Figure 10F:
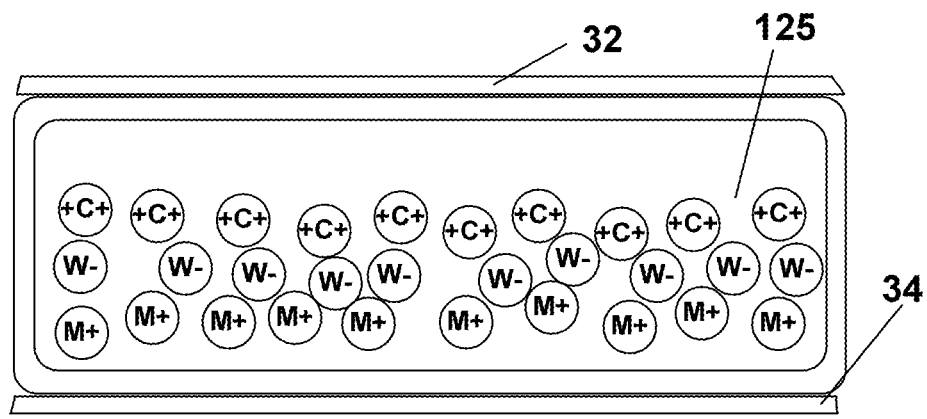

To display a green state, as illustrated in FIG. 10F, one first applies a relatively long negative pulse which, like the long negative pulse used in FIG. 10A, brings the white particles W− particles adjacent the front electrode 32 and the cyan +C+ and magenta M+ adjacent the rear electrode 34. Next, a very short positive pulse is applied. This positive pulse causes the cyan particles +C+ to move forwardly until they lie forward of the white particles W−, which of course move backwardly from the front electrode 32. The positive pulse also causes the magenta particles M+ to move forwardly, but at a slower rate than the cyan particles +C+. The final situation is similar to that shown in FIG. 10B, in as much as the cyan particles +C+ lie closest to the front electrode 32 and mask the white particles W− and the magenta particles M+. However, in the situation shown in FIG. 10F, the cyan particles are spaced from the front electrode 32 by a distance sufficient to cause substantial absorption by the yellow dye present in the fluid 125. Hence, for reasons similar to those already discussed with reference to FIG. 10E, the appearance of the display in FIG. 10F is a combination of yellow dye absorption and cyan reflection, giving a green appearance.

Figure 10G:
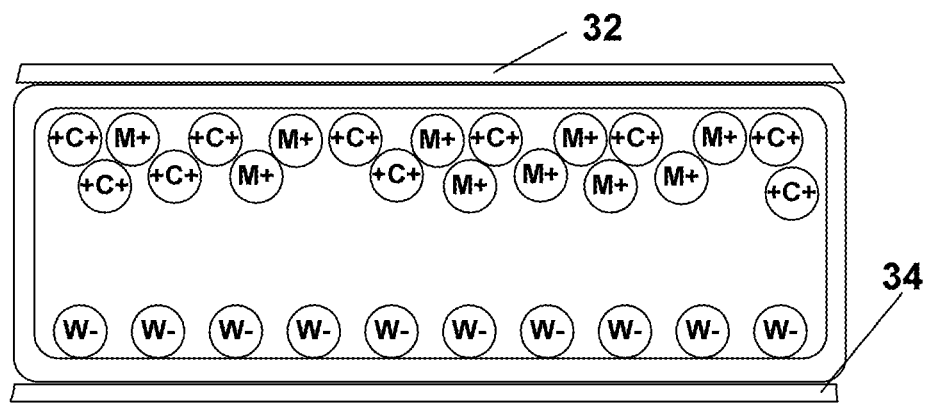

To display a blue state, as illustrated in FIG. 10G, one applies a long positive pulse which, like the long positive pulse used in FIG. 10C and the first pulse used in FIG. 10E, brings the cyan +C+ and magenta M+ particles adjacent the front electrode 32 and the white particles W−adjacent the rear electrode 34. Note that in the situation shown in FIG. 10G two different reflection mechanisms are at work. If light is reflected only from a single particle, the mixtures of reflections from cyan and magenta particles will appear to the eye as a light blue. If, however, light is reflected by at least one cyan particle and one magenta particle, the light will appear a deeper blue. Since it can be shown that much of the light scattering from electrophoretic media involves multiple reflections, the situation shown in FIG. 10G will provide a well saturated blue.

Figure 10H:
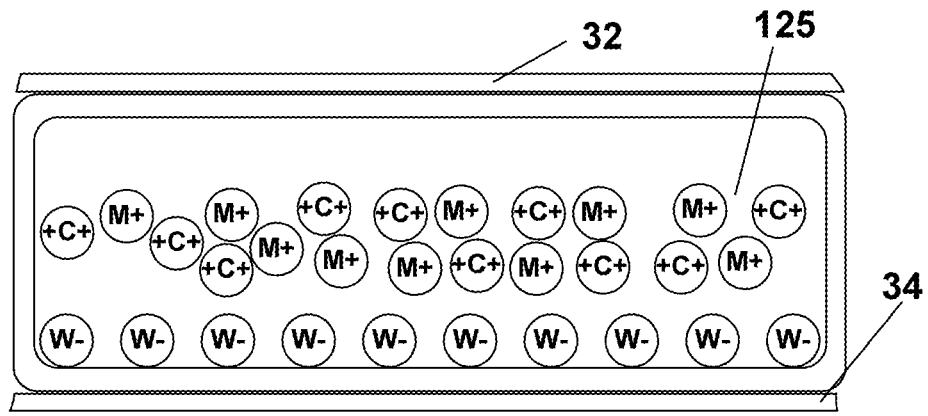

Finally, to display a black state, as illustrated in FIG. 10H, one applies a long positive pulse, which produces the situation shown in FIG. 10G, and then applies a short negative pulse. The short negative pulse moves the cyan +C+ and magenta M+ particles away from the front electrode 32 thus (for reasons similar to those already discussed with reference to FIGS. 10D, 10E and 10F) admixing the yellow color of the fluid 125 with the blue reflection shown in FIG. 10G and producing a process black appearance.

FIGS. 11A-11H illustrate a display generally similar to that illustrated in FIGS. 10A-10H but in which the cyan particles +C+ and the magenta particles M+ are transmissive rather than reflective. The use of transmissive rather than reflective particles requires some modifications of the necessary positions of the particles in certain optical states because a transmissive colored particle does not screen out the colors of particles "further back" (i.e., closer to the rear electrode 34) and hence in some optical states it is necessary to control carefully the positions of the white particles W− in order to ensure that such screening does occur.

Figure 11A:
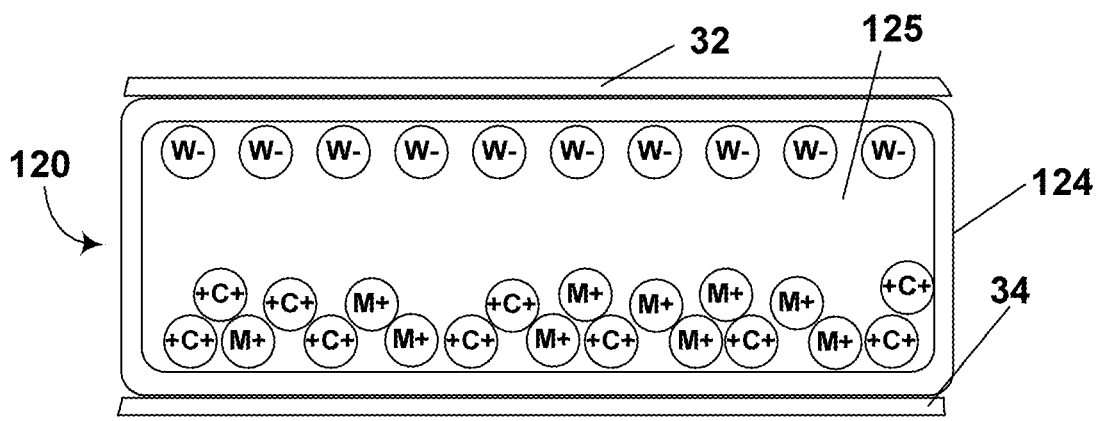
FIGS. 11A-11H depict a color display element similar to that shown in FIGS. 10A-10H but in which the cyan and magenta particles are transmissive, with FIGS. 11A-11H illustrating the same optical states as FIGS. 10A-10H respectively.

FIG. 11A shows the white state of the display. This white state is identical to that shown in FIG. 10A and is reached in exactly the same manner; since the white particles W− hide both the cyan particles +C+ and the magenta particles M+ in this state of the display, the use of transmissive cyan and magenta particles rather than reflective particles makes no difference to the appearance of this state of the display.

Figure 11B:
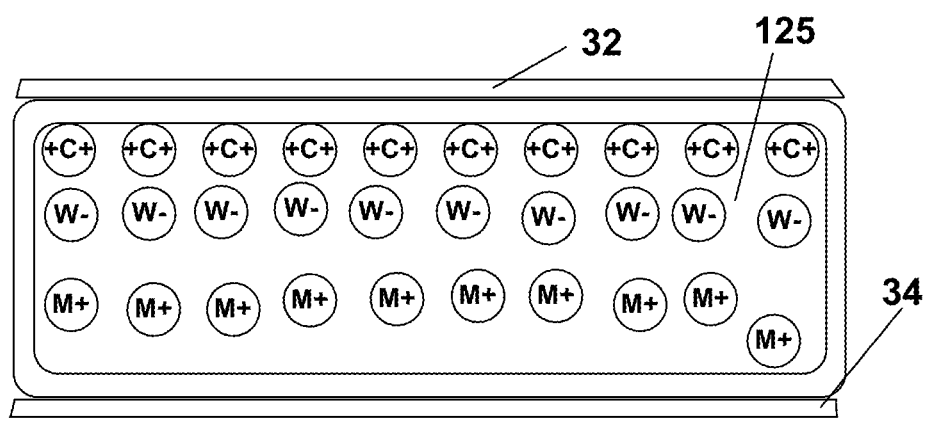

FIG. 11B shows the cyan state of the display. This state of the display differs from that shown in FIG. 10B in that the white particles W− need to be disposed immediately behind the cyan particles +C+ in order that the white particles can screen the magenta particles M+. Light entering the display through the front electrode 32 passes through the transmissive cyan particles, is reflected from the white particles, and then passes back through the cyan particles and back out of the display through the front electrode. To avoid contaminating the cyan color thus produced with yellow (and thus shifting the displayed color towards green), it is important that the white particles be close behind the cyan particles, so that the light travelling the aforesaid path does not have to travel a significant distance through the yellow fluid 125.

Provided that the electrophoretic mobility of the cyan particles +C+ is much greater than that of the magenta particles M+, and the absolute values of the electrophoretic mobilities of the magenta and white particles are comparable, the display state shown in FIG. 11B can be produced by first driving the display to the state shown in FIG. 11A and then applying to the rear electrode 34 a positive pulse just sufficient to drive the cyan particles to the front electrode 32 and the white particles a short distance away from this front electrode.

Figure 11C:
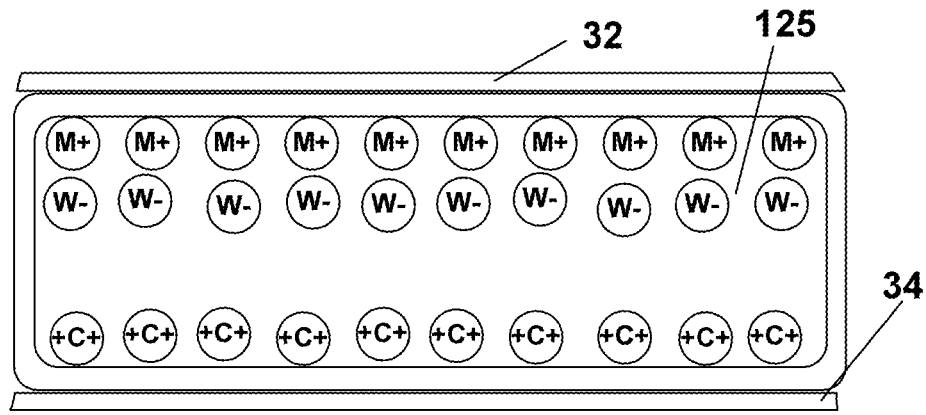

FIG. 11C shows the magenta optical state of the display. This is generally similar to the cyan optical state shown in FIG. 11B, but with the magenta particles adjacent the front electrode 32 and the cyan particles adjacent the rear electrode 34. The magenta optical state functions in a manner exactly parallel to the cyan optical state; light entering the display through the front electrode 32 passes through the transmissive magenta particles, is reflected from the white particles, and then passes back through the magenta particles and back out of the display through the front electrode. Again, to avoid contaminating the magenta color thus produced with yellow (and thus shifting the displayed color towards red), it is important that the white particles be close behind the magenta particles, so that the light travelling the aforesaid path does not have to travel a significant distance through the yellow fluid 125.

Figure 11D:
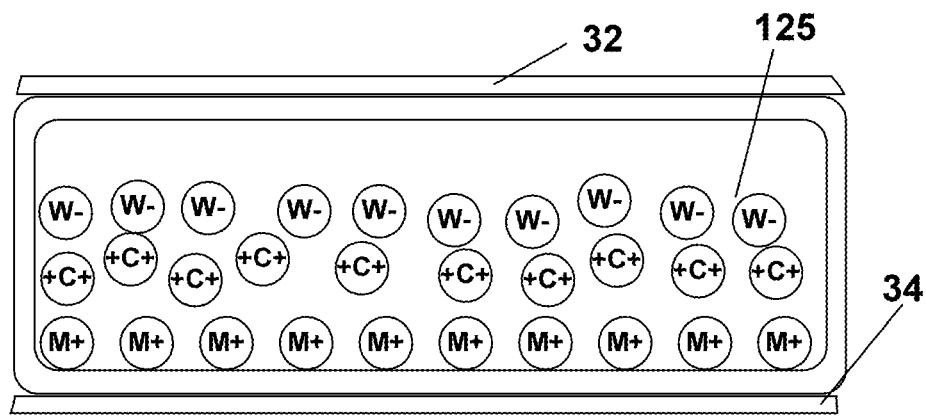

FIG. 11D shows the yellow optical state of the display. This is identical to the yellow state shown in FIG. 10D, can be produced using the same drive pulses, and the yellow color is produced in the same manner; light entering the display through the front electrode 32 passes through the yellow fluid 125, is reflected from the white particles, passes back through the yellow fluid 125 and back through the front electrode 32.

Figure 11E:
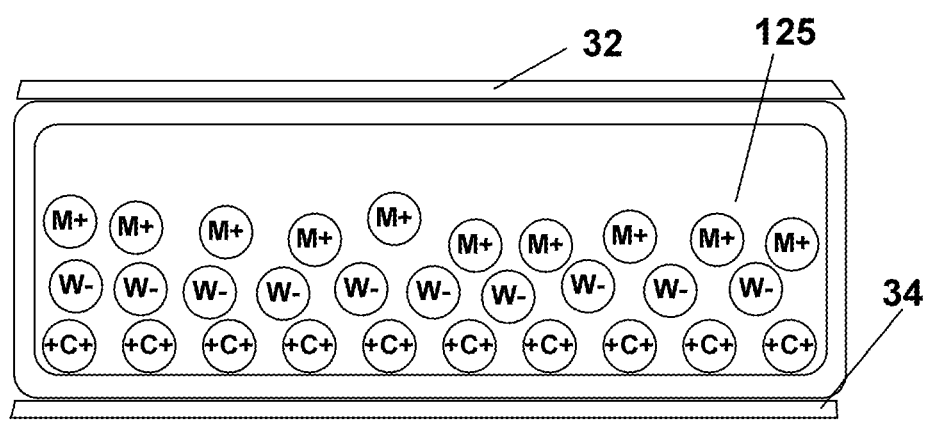

FIG. 11E shows the red optical state of the display. The positions of the particles in this red optical state are identical to those of the similar red state shown in FIG. 10E, and the red state can be brought about using the same drive pulses as in FIG. 10E. However, the actual manner in which the red color is produced in FIG. 11E differs slightly from that described with reference to FIG. 10E. In FIG. 11E, light entering the display through the front electrode 32 passes through the yellow fluid 125 and the transmissive magenta particles, is reflected from the white particles, passes back through the magenta particles and the yellow fluid 125 and back through the front electrode 32 to produce a red appearance to the display.

Figure 11F:
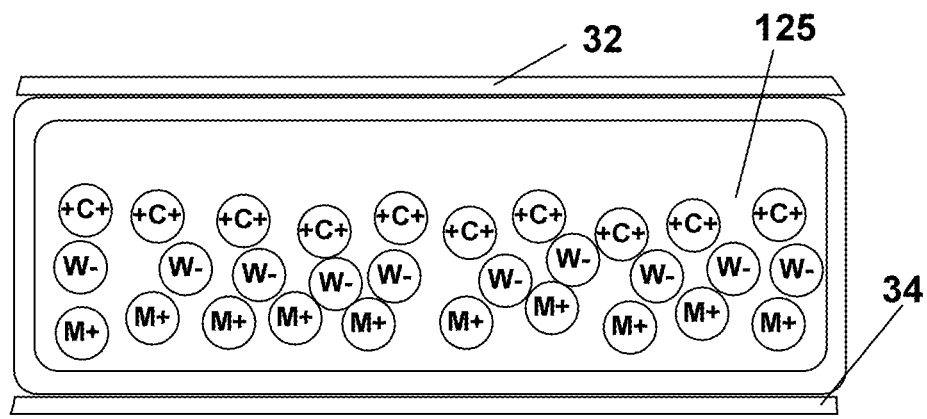

FIG. 11F shows the green optical state of the display. The positions of the particles in this green optical state are identical to those of the similar green state shown in FIG. 10F, and the green state can be brought about using the same drive pulses as in FIG. 10F. However, as with the red optical state shown in FIG. 11E, the actual manner in which the green color is produced in FIG. 11F differs slightly from that described with reference to FIG. 10F. In FIG. 11F, light entering the display through the front electrode 32 passes through the yellow fluid 125 and the transmissive cyan particles, is reflected from the white particles, passes back through the cyan particles and the yellow fluid 125 and back through the front electrode 32 to produce a green appearance to the display.

Figure 11G:
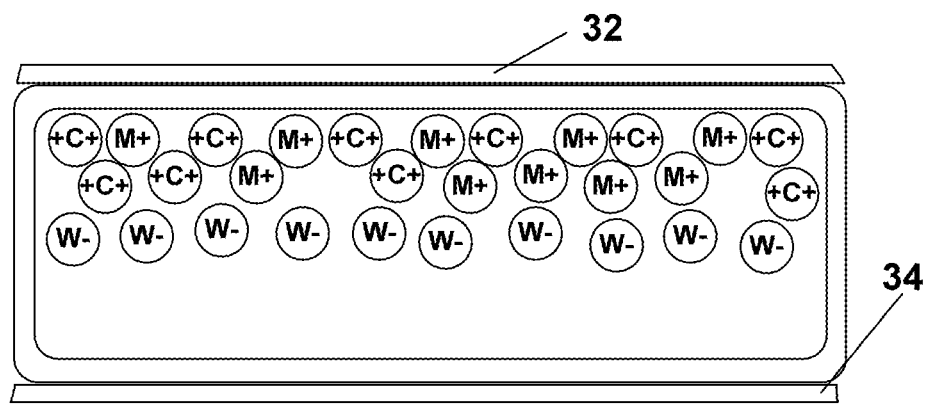

FIG. 11G shows the blue optical state of the display, which differs from the corresponding blue state shown in FIG. 10G in that the white particles are located relatively close to the front electrode, immediately behind the mixed layer of cyan and magenta particles. In FIG. 11G, light entering the display through the front electrode 32 passes through the transmissive magenta and cyan particles, is reflected from the white particles, passes back through the magenta and cyan particles and back through the front electrode 32 to produce a blue appearance to the display.

Figure 11H:
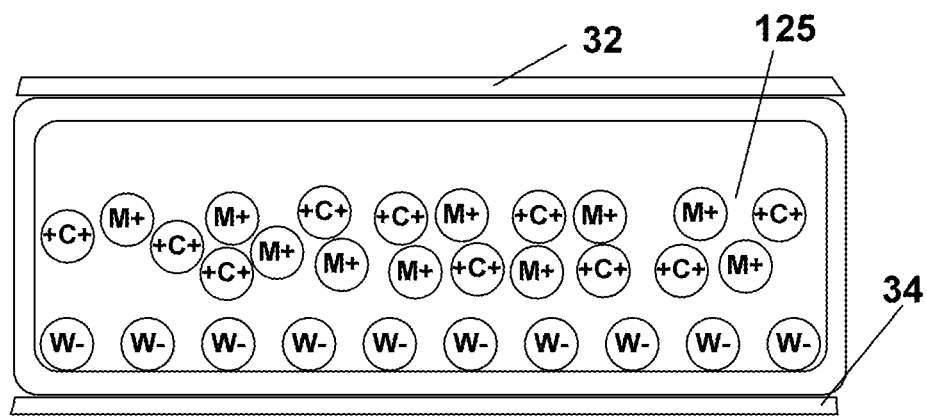

Finally, FIG. 11H shows one possible black state of the display, this black state being identical, as to particle position to that shown in FIG. 10H. However, the way in which the black state is produced is slightly different from that described above with regard to FIG. 10H. In FIG. 11H, light entering the display through the front electrode 32 passes through the transmissive magenta and cyan particles and the yellow fluid 125, so that essentially all light is absorbed before it can reach the white particles adjacent the rear electrode 34. Any light which does reach the white particles will be reflected back and again pass through the transmissive magenta and cyan particles and the yellow fluid 125, so that essentially no light will re-emerge from the front electrode 32, and a black optical state will be displayed. It should be noted that in this black optical state, there is considerable freedom as regards the disposition of the magenta and cyan particles, provided both types of particles lie closer to the front electrode than the white particles; since the yellow fluid 125 and the magenta and cyan particles are all transmissive, the exact order in which incoming light encounters the fluid and the two types of particles is essentially irrelevant, and hence the positions of the magenta and cyan particles can be varied provided both lie closer to the front electrode than the white particles. For example, in the display shown in FIGS. 11A-11H, the particle positions shown in FIG. 10G would provide a black optical state.

It will be seen from the foregoing that the displays illustrated in FIGS. 10A-10H and 11A-11H are capable of displaying white, black, cyan, magenta, yellow, red, green and blue colors over their entire display areas. As previously noted, displays using RGB color filter arrays are capable of displaying red, green and blue colors over only one third of their display area, black over the whole display area and a process white equivalent to white over one third of the display area. Similarly, displays using RGBW color filter arrays are capable of displaying red, green and blue colors over only one fourth of their display area, black over the whole display area and a process white equivalent to white over one half of the display area. The white states of the displays illustrated in FIGS. 10A-10H and 11A-11H should thus be dramatically better than that of any display based upon color filters, and the red, green and blue states should also be improved. Furthermore, the white states of the displays illustrated in FIGS. 10A-10H and 11A-11H should be dramatically better than that of the multi-particle display illustrated in FIGS. 6-9, which relies upon a process white state equivalent to white over one third of the display area.

In certain cases, it may be difficult to procure colored particles having the desired colors and relative electrophoretic mobilities needed to enable each of the optical states shown in FIGS. 10A-10H or 11A-11H to be achieved using simple sets of drive pulses. In such cases, it may be appropriate to use at least one type of particle which has an electrophoretic mobility which varies with applied voltage, so that the relative electrophoretic mobilities of two types of particles can be varied by adjusting the driving voltage used, as described in U.S. Patent Publication No. 2006/0202949, assigned to the same assignee as the present application. Since the particles used in the displays of the present invention may have voltage-dependent mobilities, references herein the particles having differing electrophoretic mobilities should be understood as including particles having differing electrophoretic mobilities at at least one driving voltage used in the display containing the particles.

Figure 12:
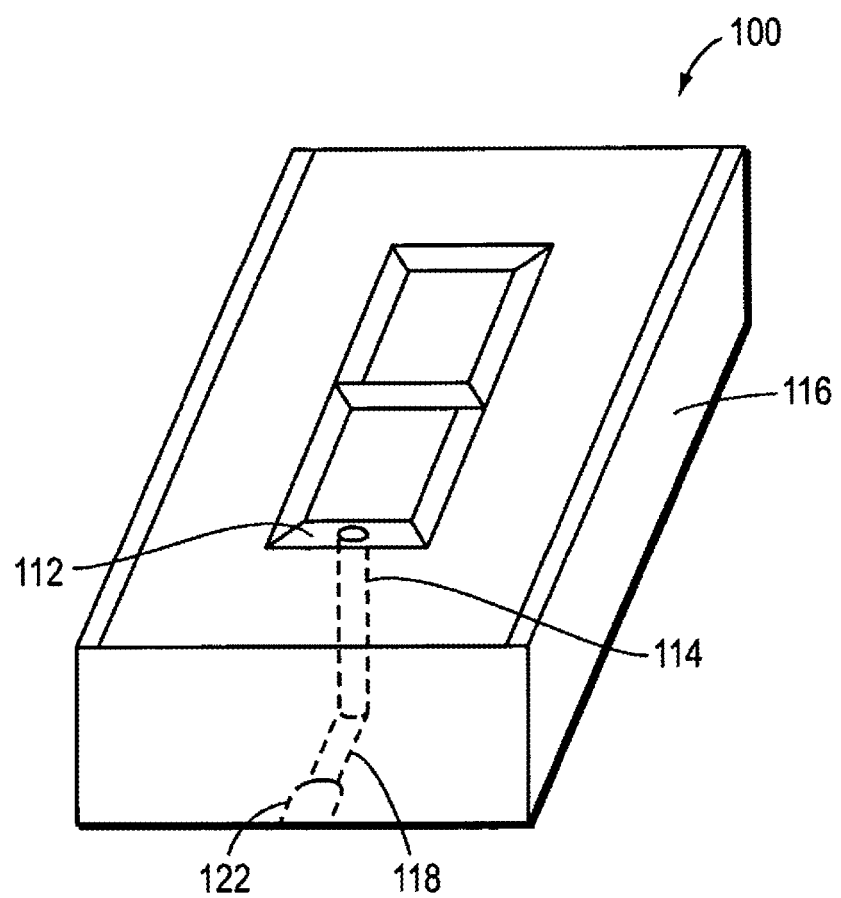
FIG. 12 is a perspective embodiment of a rear electrode structure for addressing a seven segment display.

In FIG. 12, the rear substrate 100 for a seven segment display is shown that improves on normal rear electrode structures by providing a means for arbitrarily connecting to any electrode section on the rear of the display without the need for conductive trace lines on the surface of the patterned substrate or a patterned counter electrode on the front of the display. Small conductive vias through the substrate allow connections to the rear electrode structure. On the back of the substrate, these vias are connected to a network of conductors. These conductors can be run so as to provide a simple connection to the entire display. For example, segment 112 is connected by via 114 through the substrate 116 to conductor 118. A network of conductors may run multiple connections (not shown) to edge connector 122. This connector can be built into the structure of the conductor such as edge connector 122. Each segment of the rear electrode can be individually addressed easily through edge connector 122. A continuous top electrode can be used with the substrate 116.

The rear electrode structure depicted in FIG. 12 is useful for any display media, but is particularly advantageous for particle-based displays because such displays do not have a defined appearance when not addressed. The rear electrode should be completely covered in an electrically conducting material with room only to provide necessary insulation of the various electrodes. This is so that the connections on the rear of the display can be routed with out concern for affecting the appearance of the display. Having a mostly continuous rear electrode pattern assures that the display material is shielded from the rear electrode wire routing.

Figure 13:
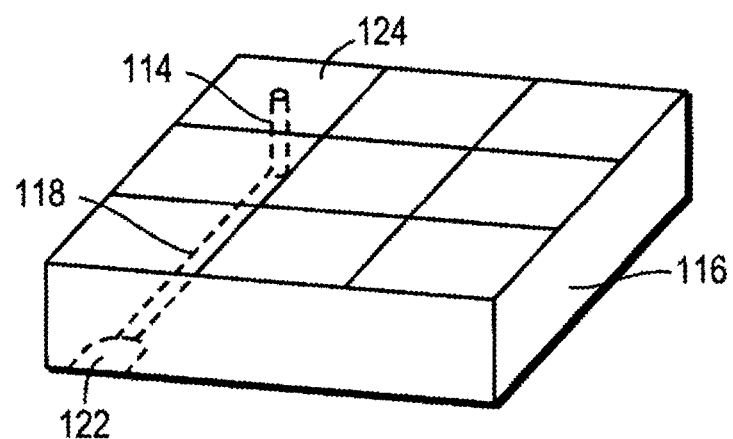
FIG. 13 is a perspective embodiment of a rear electrode structure for addressing a three by three matrix display element.

In FIG. 13, a 3×3 matrix is shown. Here, matrix segment 124 on a first side of substrate 116 is connected by via 114 to conductor 118 on a second side of substrate 116. The conductors 18 run to an edge and terminate in a edge connector 122. Although the display element of FIG. 13 shows square segments 124, the segments may be shaped or sized to form a predefined display pattern.

Figure 14:
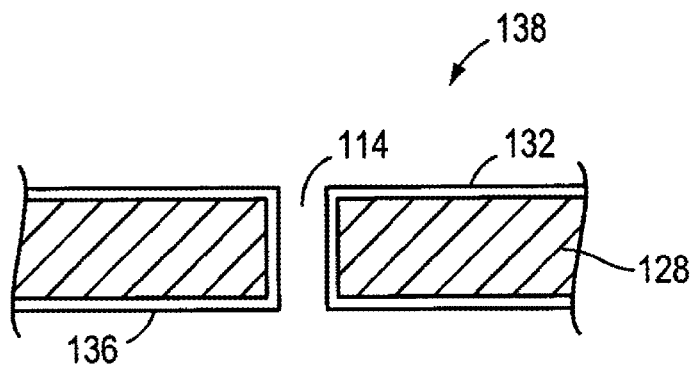
FIG. 14 is a cross-sectional view of a printed circuit board used as a rear electrode addressing structure.

In FIG. 14, a printed circuit board 138 is used as the rear electrode structure. The front of the printed circuit board 138 has copper pads 132 etched in the desired shape. There are plated vias 114 connecting these electrode pads to an etched wire structure 136 on the rear of the printed circuit board 138. The wires 136 can be run to one side or the rear of the printed circuit board 138 and a connection can be made using a standard connector such as a surface mount connector or using a flex connector and anisotropic glue (not shown). Vias may be filled with a conductive substance, such as solder or conductive epoxy, or an insulating substance, such as epoxy.

Alternatively, a flex circuit such a copper-clad polyimide may be used for the rear electrode structure of FIG. 14. Printed circuit board 138 may be made of polyimide, which acts both as the flex connector and as the substrate for the electrode structure. Rather than copper pads 132, electrodes (not shown) may be etched into the copper covering the polyimide printed circuit board 138. The plated through vias 114 connect the electrodes etched onto the substrate the rear of the printed circuit board 138, which may have an etched conductor network thereon (the etched conductor network is similar to the etched wire structure 136).

Figure 15:
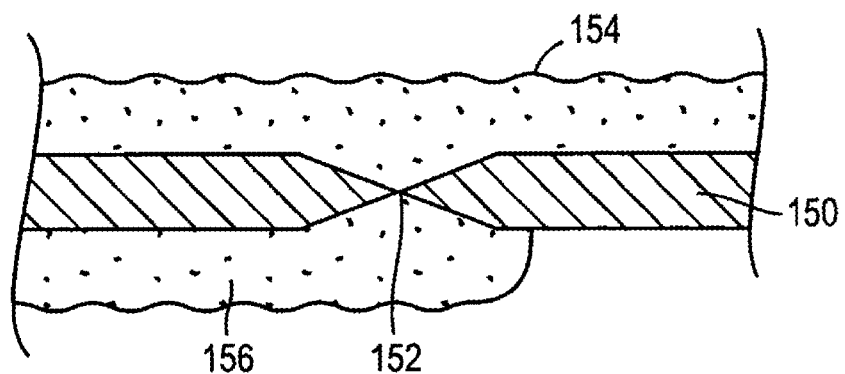
FIG. 15 is a cross-sectional view of a dielectric sheet used as a rear electrode addressing structure.

In FIG. 15, a thin dielectric sheet 150, such as polyester, polyimide, or glass can be used to make a rear electrode structure. Holes 152 are punched, drilled, abraded, or melted through the sheet where conductive paths are desired. The front electrode 154 is made of conductive ink printed using any technique described above. The holes should be sized and the ink should be selected to have a viscosity so that the ink fills the holes. When the back structure 156 is printed, again using conductive ink, the holes are again filled. By this method, the connection between the front and back of the substrate is made automatically.

Figure 16:
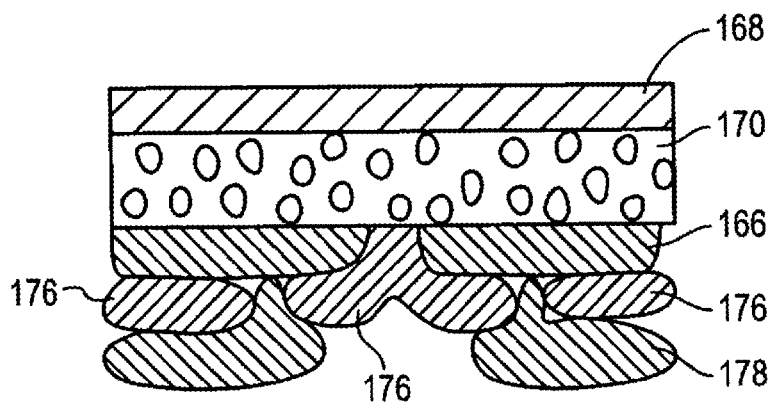
FIG. 16 is a cross-sectional view of a rear electrode addressing structure that is formed by printing.

In FIG. 16, the rear electrode structure can be made entirely of printed layers. A conductive layer 166 can be printed onto the back of a display comprised of a clear, front electrode 168 and a printable display material 170. A clear electrode may be fabricated from indium tin oxide or conductive polymers such as polyanilines and polythiophenes. A dielectric coating 176 can be printed leaving areas for vias. Then, the back layer of conductive ink 178 can be printed. If necessary, an additional layer of conductive ink can be used before the final ink structure is printed to fill in the holes.

This technique for printing displays can be used to build the rear electrode structure on a display or to construct two separate layers that are laminated together to form the display. For example an electronically active ink may be printed on an indium tin oxide electrode. Separately, a rear electrode structure as described above can be printed on a suitable substrate, such as plastic, polymer films, or glass. The electrode structure and the display element can be laminated to form a display.

Figure 17:
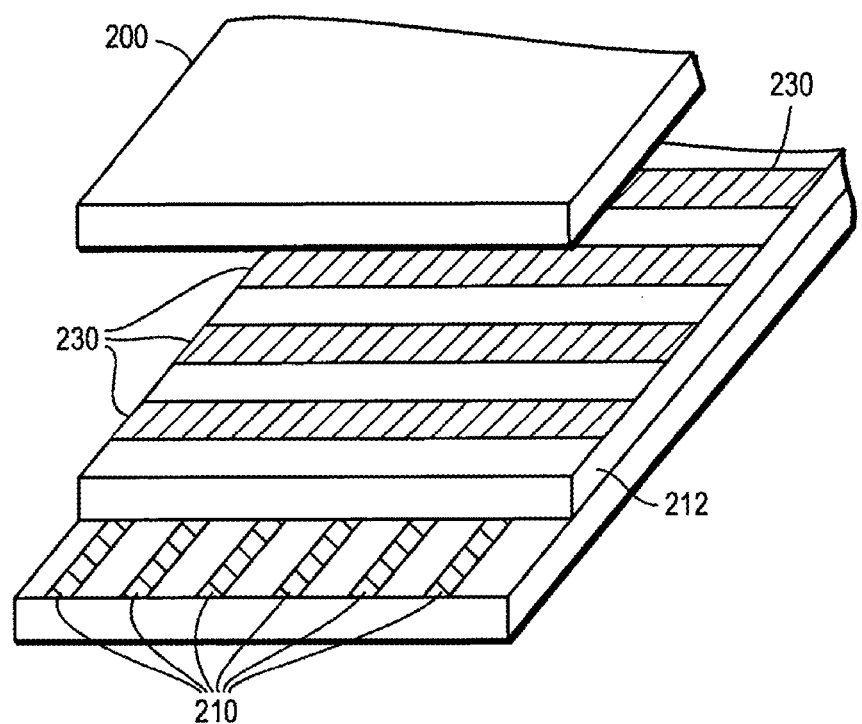
FIG. 17 is a perspective view of an embodiment of a control grid addressing structure.

Referring now to FIG. 17, a threshold may be introduced into an electrophoretic display cell by the introduction of a third electrode. One side of the cell is a continuous, transparent electrode 200 (anode). On the other side of the cell, the transparent electrode is patterned into a set of isolated column electrode strips 210. An insulator 212 covers the column electrodes 210, and an electrode layer on top of the insulator is divided into a set of isolated row electrode strips 230, which are oriented orthogonal to the column electrodes 210. The row electrodes 230 are patterned into a dense array of holes, or a grid, beneath which the exposed insulator 212 has been removed, forming a multiplicity of physical and potential wells.

A positively charged particle 50 is loaded into the potential wells by applying a positive potential (e.g. 30V) to all the column electrodes 210 while keeping the row electrodes 230 at a less positive potential (e.g. 15V) and the anode 200 at zero volts. The particle 50 may be a conformable capsule that situates itself into the physical wells of the control grid. The control grid itself may have a rectangular cross-section, or the grid structure may be triangular in profile. It can also be a different shape which encourages the microcapsules to situate in the grid, for example, hemispherical.

The anode 200 is then reset to a positive potential (e.g. 50V). The particle will remain in the potential wells due to the potential difference in the potential wells: this is called the Hold condition. To address a display element the potential on the column electrode associated with that element is reduced, e.g. by a factor of two, and the potential on the row electrode associated with that element is made equal to or greater than the potential on the column electrode. The particles in this element will then be transported by the electric field due to the positive voltage on the anode 200. The potential difference between row and column electrodes for the remaining display elements is now less than half of that in the normal Hold condition. The geometry of the potential well structure and voltage levels are chosen such that this also constitutes a Hold condition, i.e., no particles will leave these other display elements and hence there will be no half-select problems. This addressing method can select and write any desired element in a matrix without affecting the pigment in any other display element. A control electrode device can be operated such that the anode electrode side of the cell is viewed.

The control grid may be manufactured through any of the processes known in the art, or by several novel processes described herein. That is, according to traditional practices, the control grid may be constructed with one or more steps of photolithography and subsequent etching, or the control grid may be fabricated with a mask and a "sandblasting" technique.

In another embodiment, the control grid is fabricated by an embossing technique on a plastic substrate. The grid electrodes may be deposited by vacuum deposition or sputtering, either before or after the embossing step. In another embodiment, the electrodes are printed onto the grid structure after it is formed, the electrodes consisting of some kind of printable conductive material which need not be clear (e.g. a metal or carbon-doped polymer, an intrinsically conducting polymer, etc.).

In a preferred embodiment, the control grid is fabricated with a series of printing steps. The grid structure is built up in a series of one or more printed layers after the cathode has been deposited, and the grid electrode is printed onto the grid structure. There may be additional insulator on top of the grid electrode, and there may be multiple grid electrodes separated by insulator in the grid structure. The grid electrode may not occupy the entire width of the grid structure, and may only occupy a central region of the structure, in order to stay within reproducible tolerances. In another embodiment, the control grid is fabricated by photoetching away a glass, such as a photostructural glass.

In an encapsulated electrophoretic image display, an electrophoretic suspension, such as the ones described previously, is placed inside discrete compartments that are dispersed in a polymer matrix. This resulting material is highly susceptible to an electric field across the thickness of the film. Such a field is normally applied using electrodes attached to either side of the material. However, as described above in connection with FIGS. 3A-3D, some display media may be addressed by writing electrostatic charge onto one side of the display material. The other side normally has a clear or opaque electrode. For example, a sheet of encapsulated electrophoretic display media can be addressed with a head providing DC voltages.

In another implementation, the encapsulated electrophoretic suspension can be printed onto an area of a conductive material such as a printed silver or graphite ink, aluminized Mylar, or any other conductive surface. This surface which constitutes one electrode of the display can be set at ground or high voltage. An electrostatic head consisting of many electrodes can be passed over the capsules to addressing them. Alternatively, a stylus can be used to address the encapsulated electrophoretic suspension.

In another implementation, an electrostatic write head is passed over the surface of the material. This allows very high resolution addressing. Since encapsulated electrophoretic material can be placed on plastic, it is flexible. This allows the material to be passed through normal paper handling equipment. Such a system works much like a photocopier, but with no consumables. The sheet of display material passes through the machine and an electrostatic or electrophotographic head addresses the sheet of material.

In another implementation, electrical charge is built up on the surface of the encapsulated display material or on a dielectric sheet through frictional or triboelectric charging. The charge can built up using an electrode that is later removed. In another implementation, charge is built up on the surface of the encapsulated display by using a sheet of piezoelectric material.

Figure 18:
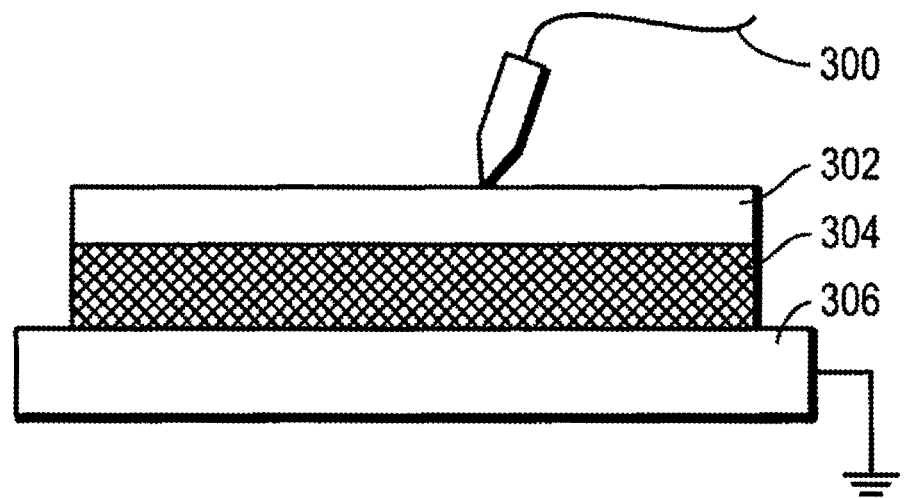
FIG. 18 is an embodiment of an electrophoretic display that can be addressed using a stylus.

FIG. 18 shows an electrostatically written display. Stylus 300 is connected to a positive or negative voltage. The head of the stylus 300 can be insulated to protect the user. Dielectric layer 302 can be, for example, a dielectric coating or a film of polymer. In other embodiments, dielectric layer 302 is not provided and the stylus 300 contacts the encapsulated electrophoretic display 304 directly. Substrate 306 is coated with a clear conductive coating such as ITO coated polyester. The conductive coating is connected to ground. The display 304 may be viewed from either side.

Microencapsulated displays offer a useful means of creating electronic displays, many of which can be coated or printed. There are many versions of microencapsulated displays, including microencapsulated electrophoretic displays. These displays can be made to be highly reflective, bistable, and low power.

To obtain high resolution displays, it is useful to use some external addressing means with the microencapsulated material. This invention describes useful combinations of addressing means with microencapsulated electrophoretic materials in order to obtain high resolution displays.

One method of addressing liquid crystal displays is the use of silicon-based thin film transistors to form an addressing backplane for the liquid crystal. For liquid crystal displays, these thin film transistors are typically deposited on glass, and are typically made from amorphous silicon or polysilicon. Other electronic circuits (such as drive electronics or logic) are sometimes integrated into the periphery of the display. An emerging field is the deposition of amorphous or polysilicon devices onto flexible substrates such as metal foils or plastic films.

The addressing electronic backplane could incorporate diodes as the nonlinear element, rather than transistors. Diode-based active matrix arrays have been demonstrated as being compatible with liquid crystal displays to form high resolution devices.

There are also examples of crystalline silicon transistors being used on glass substrates. Crystalline silicon possesses very high mobilities, and thus can be used to make high performance devices. Presently, the most straightforward way of constructing crystalline silicon devices is on a silicon wafer. For use in many types of liquid crystal displays, the crystalline silicon circuit is constructed on a silicon wafer, and then transferred to a glass substrate by a "liftoff" process. Alternatively, the silicon transistors can be formed on a silicon wafer, removed via a liftoff process, and then deposited on a flexible substrate such as plastic, metal foil, or paper. As another implementation, the silicon could be formed on a different substrate that is able to tolerate high temperatures (such as glass or metal foils), lifted off, and transferred to a flexible substrate. As yet another implementation, the silicon transistors are formed on a silicon wafer, which is then used in whole or in part as one of the substrates for the display.

The use of silicon-based circuits with liquid crystals is the basis of a large industry. Nevertheless, these display possess serious drawbacks. Liquid crystal displays are inefficient with light, so that most liquid crystal displays require some sort of backlighting. Reflective liquid crystal displays can be constructed, but are typically very dim, due to the presence of polarizers. Most liquid crystal devices require precise spacing of the cell gap, so that they are not very compatible with flexible substrates. Most liquid crystal displays require a "rubbing" process to align the liquid crystals, which is both difficult to control and has the potential for damaging the TFT array.

The combination of these thin film transistors with microencapsulated electrophoretic displays should be even more advantageous than with liquid crystal displays. Thin film transistor arrays similar to those used with liquid crystals could also be used with the microencapsulated display medium. As noted above, liquid crystal arrays typically requires a "rubbing" process to align the liquid crystals, which can cause either mechanical or static electrical damage to the transistor array. No such rubbing is needed for microencapsulated displays, improving yields and simplifying the construction process.

Microencapsulated electrophoretic displays can be highly reflective. This provides an advantage in high-resolution displays, as a backlight is not required for good visibility. Also, a high-resolution display can be built on opaque substrates, which opens up a range of new materials for the deposition of thin film transistor arrays.

Moreover, the encapsulated electrophoretic display is highly compatible with flexible substrates. This enables high-resolution TFT displays in which the transistors are deposited on flexible substrates like flexible glass, plastics, or metal foils. The flexible substrate used with any type of thin film transistor or other nonlinear element need not be a single sheet of glass, plastic, metal foil, though. Instead, it could be constructed of paper. Alternatively, it could be constructed of a woven material. Alternatively, it could be a composite or layered combination of these materials.

As in liquid crystal displays, external logic or drive circuitry can be built on the same substrate as the thin film transistor switches.

In another implementation, the addressing electronic backplane could incorporate diodes as the nonlinear element, rather than transistors.

In another implementation, it is possible to form transistors on a silicon wafer, dice the transistors, and place them in a large area array to form a large, TFT-addressed display medium. One example of this concept is to form mechanical impressions in the receiving substrate, and then cover the substrate with a slurry or other form of the transistors. With agitation, the transistors will fall into the impressions, where they can be bonded and incorporated into the device circuitry. The receiving substrate could be glass, plastic, or other nonconductive material. In this way, the economy of creating transistors using standard processing methods can be used to create large-area displays without the need for large area silicon processing equipment.

While the examples described here are listed using encapsulated electrophoretic displays, there are other particle-based display media which should also work as well, including encapsulated suspended particles and rotating ball displays.

While the invention has been particularly shown and described with reference to specific preferred embodiments, it should be understood by those skilled in the art that various changes in form and detail may be made therein without departing from the spirit and scope of the invention as defined by the appended claims.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for displaying a plurality of colors in an electrophoretic display including an electrophoretic medium disposed between two electrodes, at least one of the electrodes being light-transmissive, the electrophoretic medium comprising a first species of white reflective particles, a second species of transmissive particles, and a third species of transmissive particles, wherein the first, second, and third particles are different in color and have different electrophoretic mobilities, the method comprising:

driving the second species of transmissive particles adjacent the light-transmissive electrode and driving the first species of white reflective particles between the second and third species of transmissive particles to achieve a first color;

driving the third species of transmissive particles adjacent the light-transmissive electrode and driving the first species of white reflective particles between the second and third species of transmissive particles to achieve a second color; and driving the first, second, and third particles away from the light-transmissive electrode to achieve a third color.

2. The method of claim 1, wherein the second and third species of particles are cyan and magenta, respectively, in color.

3. The method of claim 1, wherein the first species of reflective particles are white in color.

4. The method of claim 1, further comprising driving the first species of reflective particles adjacent the light-transmissive electrode to achieve a fourth color.

5. An electronic book reader, portable computer, tablet computer, cellular telephone, smart card, sign, watch, shelf label or flash drive incorporating the method of claim 1.

* * * * *